US012604264B2

(12) United States Patent
Bernardos et al.

(10) Patent No.: US 12,604,264 B2

(45) Date of Patent: Apr. 14, 2026

(54) METHODS, ARCHITECTURES, APPARATUSES AND SYSTEMS FOR MULTIACCESS EDGE COMPUTING APPLICATIONS ON WIRELESS TRANSMIT-RECEIVE UNITS

(71) Applicant: InterDigital Patent Holdings, Inc., Wilmington, DE (US)

(72) Inventors: Carlos Jesus Bernardos, Madrid (ES); Alain Mourad, Ascot (GB); Antonio de la Oliva, Madrid (ES); Debashish Purkayastha, Collegeville, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 326 days.

(21) Appl. No.: 18/290,395

(22) PCT Filed: May 13, 2022

(86) PCT No.: PCT/US2022/029222

§ 371 (c)(1),
(2) Date: Nov. 13, 2023

(87) PCT Pub. No.: WO2022/241233

PCT Pub. Date: Nov. 17, 2022

(65) Prior Publication Data

US 2024/0251342 A1 Jul. 25, 2024

Related U.S. Application Data

(60) Provisional application No. 63/188,042, filed on May 13, 2021.

(51) Int. Cl.
*H04W 48/20* (2009.01)
*H04W 28/02* (2009.01)
*H04W 64/00* (2009.01)

(52) U.S. Cl.
CPC ....... *H04W 48/20* (2013.01); *H04W 28/0268* (2013.01); *H04W 64/003* (2013.01)

(58) Field of Classification Search
CPC ........... H04W 4/20; H04W 4/50; H04W 4/80; H04W 28/0268; H04W 48/20; H04L 67/10; H04L 67/12; H04L 67/55

(Continued)

(56) References Cited

U.S. PATENT DOCUMENTS

| | | | |
|---|---|---|---|
| 12,041,177 B2 * | 7/2024 | Guim Bernat | H04W 12/009 |
| 2013/0073600 A1 * | 3/2013 | Jenkins | G06F 9/5027 |
| | | | 709/201 |

(Continued)

FOREIGN PATENT DOCUMENTS

| WO | WO 2022020561 A1 | 1/2022 |
|---|---|---|
| WO | WO 2022187418 A1 | 9/2022 |

OTHER PUBLICATIONS

European Telecommunications Standards Institute (ETSI), "Multi-access Edge Computing (MEC); Framework and Reference Architecture", Multi-access Edge Computing (MEC) ETSI Industry Specification Group (ISG), ETSI GS MEC 003 V2.1.1, Jan. 2019, 21 pages.

(Continued)

*Primary Examiner* — Jean A Gelin

(74) *Attorney, Agent, or Firm* — VOLPE KOENIG

(57) ABSTRACT

Procedures, methods, architectures, apparatuses, systems, devices, and computer program products are disclosed for Multi-access Edge Computing, MEC, applications on Wireless Transmit-Receive Units, WTRUs. WTRUs hosting constrained, or limited capability, MEC resources according to embodiments, may advertise MEC capabilities to other WTRUs or to a full MEC system. WTRUs may request instantiation, deletion of MEC applications instantiated for (Continued)

their benefit on other WTRUs hosting constrained MEC resources, or may request migration of a MEC application from one WTRU to another WTRU, for example to ensure Quality of Service, QoS, requirements for the MEC application.

15 Claims, 23 Drawing Sheets

(58) Field of Classification Search
USPC ......................................................... 370/329
See application file for complete search history.

(56)                          References Cited

U.S. PATENT DOCUMENTS

| | | | | |
|---|---|---|---|---|
| 2016/0006800 | A1 | 1/2016 | Summers et al. | |
| 2018/0049179 | A1* | 2/2018 | Shah | H04W 72/51 |
| 2019/0141536 | A1* | 5/2019 | Bachmutsky | H04L 67/10 |
| 2020/0099742 | A1* | 3/2020 | Puente Pestaña | H04L 67/52 |
| 2020/0107166 | A1* | 4/2020 | Huang | H04M 15/61 |
| 2020/0228880 | A1* | 7/2020 | Iyer | H04N 21/251 |
| 2021/0084446 | A1* | 3/2021 | Dowlatkhah | H04W 4/50 |
| 2021/0243580 | A1* | 8/2021 | Wang | H04W 28/24 |
| 2021/0385865 | A1* | 12/2021 | Mueck | H04W 74/0875 |
| 2022/0014963 | A1* | 1/2022 | Yeh | H04W 28/0268 |
| 2022/0030585 | A1* | 1/2022 | Jin | H04W 36/0033 |
| 2022/0191100 | A1* | 6/2022 | Kim | H04L 41/0853 |
| 2022/0197773 | A1* | 6/2022 | Butler | H04N 21/2223 |
| 2022/0295230 | A1* | 9/2022 | Dowlatkhah | H04W 80/12 |
| 2022/0303331 | A1* | 9/2022 | Svennebring | H04N 21/44209 |
| 2022/0329648 | A1* | 10/2022 | De Foy | H04L 67/10 |
| 2022/0329649 | A1* | 10/2022 | Feng | H04L 67/51 |
| 2023/0134708 | A1* | 5/2023 | Feng | H04L 67/1014 709/203 |
| 2023/0308199 | A1* | 9/2023 | Svennebring | H04B 17/3913 |

OTHER PUBLICATIONS

Farkas et al., "5G—Ultra-Reliable Wireless Technology with Low Latency", Internet Engineering Task Force (IETF), Internet Draft, draft-farkas-raw-5g-00, Mar. 30, 2020, 20 pages.

European Telecommunications Standards Institute (ETSI), "Multi-access Edge Computing (MEC); Study on MEC in resource constrained terminals, fixed or mobile", Multi-access Edge Computing (MEC) ETSI Industry Specification Group (ISG), Draft ETSI GR MEC 036 V3.0.3, Oct. 2020, 17 pages.

European Telecommunications Standards Institute (ETSI), "Multi access Edge Computing (MEC); Device application Interface", Multi-access Edge Computing (MEC) ETSI Industry Specification Group (ISG), ETSI GS MEC 016 V2.2.1, Apr. 2020, 28 pages.

Kekki et al., "MEC in 5G networks", European Telecommunications Standards Institute (ETSI), ETSI White Paper No. 28, First Edition, Jun. 2018, 28 pages.

* cited by examiner

| Attribute Name | Data Type | Cardinality | Description |
|---|---|---|---|
| mecCapabilities | Array (Structure (inlined)) | 0..N | List of Device MEC Capabilities Available to the MEC System. |
| >ueMecInfo | Structure (inlined) | 1 | WTRU (c)MEC Capabilities. |
| >>validityTime | String | 0..1 | Time How Long this Information is Valid. |
| >>ueLocation | String | 0..1 | Geolocation. It can be used by Consumer WTRUs to Select the Correct cMEC where to Instantiate an App. It can also be used to Filter which cMECs are Advertised by the MEC System. |
| >>ueId | String | 0..1 | Identifier of the WTRU cMEC. This Attribute may be Unique within the Scope of the Network and MEC Systems Involved. |
| >>ueMecDescription | String | 1 | Human Readable Description of the (c)MEC. |
| >>ueBatteryLifetime | String | 0..1 | Expected Remaining Battery Lifetime. 0 if not Running on Battery Power. |
| >>mx2URI | URI | 0..1 | Address of the cUALCMP Exposed Interface. |
| >>rawNetId | String | 0..1 | Identifier of RAW-capable Network the WTRU is Attached to. May be Absent if the WTRU is not Connected to a RAW-capable Network or the WTRU is not RAW-Capable. |

FIG. 13

| Attribute Name | Data Type | Cardinality | Description |
|---|---|---|---|
| mecCapabilities | Array (Structure (inlined)) | 0..N | List of Device MEC Capabilities Available to the MEC System. |
| >ueMecInfo | Structure (inlined) | 1 | WTRU (c)MEC Capabilities. |
| >>validityTime | String | 0..1 | Time How Long this Information is Valid. |
| >>ueId | String | 1 | Identifier of the WTRU cMEC. This Attribute may be Unique within the Scope of the Network and MEC Systems Involved. |
| >>referenceURI | URI | 0..1 | Address of the MEC Capabilities Context Created at the System. |

FIG. 14

| Attribute Name | Data Type | Cardinality | Description |
|---|---|---|---|
| ueMecList | Array (Structure (inlined)) | 0..N | List of Neighboring WTRUs Hosting cMEC known to the System As Defined Below. |
| >ueMecInfo | Structure (inlined) | 1 | WTRU (c)MEC Capabilities. |
| >>validityTime | String | 0..1 | Time How Long this Information is Valid. |
| >>ueLocation | String | 0..1 | Geolocation. It can be used by Consumer WTRUs to Select the Correct cMEC where to Instantiate an App. It can also be used to Filter which cMECs are Advertised by the MEC System. |
| >>ueId | String | 1 | Identifier of the WTRU cMEC. This Attribute may be Unique within the Scope of the Network and MEC Systems Involved. |
| >>ueMecDescription | String | 0..1 | Human Readable Description of the (c)MEC. |
| >>ueBatteryLifetime | String | 0..1 | Expected Remaining Battery Lifetime. 0 if not Running on Battery Power. |
| >>mx2URI | URI | 0..1 | Address of the cUALCMP Exposed Interface. |
| >>rawNetId | String | 0..1 | Identifier of RAW-capable Network the WTRU is Attached to. May be Absent if the WTRU is not Connected to a RAW-capable Network or the WTRU is not RAW-Capable. |
| >appList | Array (Structure (inlined)) | 0..N | (Optional) List (Complete List or Subset) of user Applications Available to the Device Application at the cMEC. |

FIG. 15

| Attribute Name | Data Type | Cardinality | Description |
|---|---|---|---|
| >appList | Array (Structure (inlined)) | 0..N | List of user Applications Available to the Device Application. As Defined Below. |
| >ueMecInfo | Structure (inlined) | 1 | WTRU (c)MEC Capabilities. |
| >>validityTime | String | 0..1 | Time How Long this Information is Valid. |
| >>ueLocation | String | 0..1 | Geolocation. It can be used by Consumer WTRUs to Select the Correct cMEC where to Instantiate an App. It can also be used to Filter which cMECs are Advertised by the MEC System. |
| >>ueId | String | 1 | Identifier of the WTRU cMEC. This Attribute may be Unique within the Scope of the Network and MEC Systems Involved. |
| >>ueMecDescription | String | 0..1 | Human Readable Description of the (c)MEC. |
| >>ueBatteryLifetime | String | 0..1 | Expected Remaining Battery Lifetime. 0 if not Running on Battery Power. |
| >>rawNetId | String | 0..1 | Identifier of RAW-capable Network the WTRU is Attached to. May be Absent if the WTRU is not Connected to a RAW-capable Network or the WTRU is not RAW-Capable. |

FIG. 16

| Attribute Name | Data Type | Cardinality | Description |
|---|---|---|---|
| >appInfo | Structure (inlined) | 1 | |
| >>appLifetime | uint32 | 0..1 | The Requested Lifetime of the Application. This Allows the Hosting cMEC to Compute if it is Willing and Capable of Granting this Request. |
| >>appMigratable | uint32 | 0..1 | Indicates if the App can be Migrated to Another (c)MEC or not. Possible Values: 0: NON MIGRATABLE 1: MIGRATABLE, Non-transparent (Requires Consumer WTRU Intervention) 2: MIGRATABLE, Transparent (without Consumer WTRU Intervention) |

FIG. 17

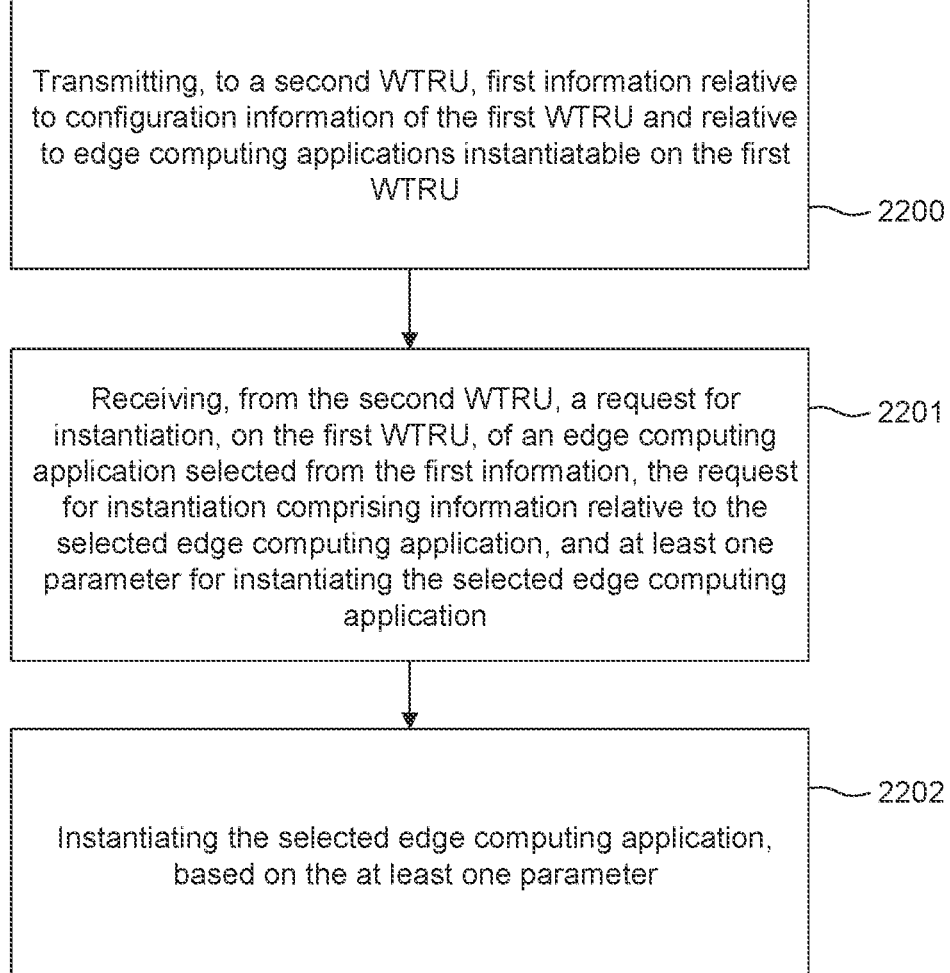

Transmitting, to a second WTRU, first information relative to configuration information of the first WTRU and relative to edge computing applications instantiatable on the first WTRU ⟋⁓ 2200

Receiving, from the second WTRU, a request for instantiation, on the first WTRU, of an edge computing application selected from the first information, the request for instantiation comprising information relative to the selected edge computing application, and at least one parameter for instantiating the selected edge computing application ⟋⁓ 2201

Instantiating the selected edge computing application, based on the at least one parameter ⟋⁓ 2202

FIG. 19

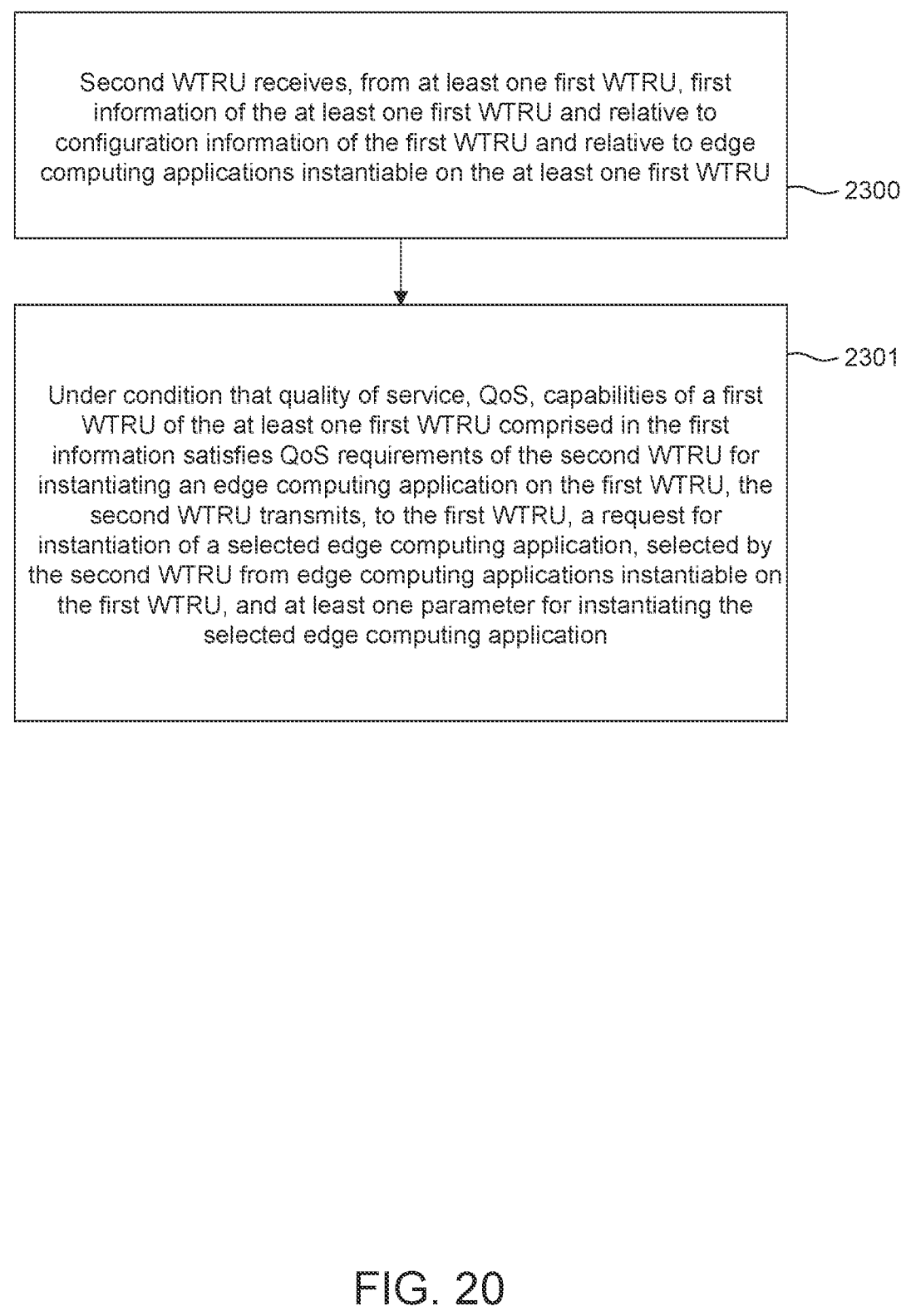

Second WTRU receives, from at least one first WTRU, first information of the at least one first WTRU and relative to configuration information of the first WTRU and relative to edge computing applications instantiable on the at least one first WTRU ⌐~ 2300

Under condition that quality of service, QoS, capabilities of a first WTRU of the at least one first WTRU comprised in the first information satisfies QoS requirements of the second WTRU for instantiating an edge computing application on the first WTRU, the second WTRU transmits, to the first WTRU, a request for instantiation of a selected edge computing application, selected by the second WTRU from edge computing applications instantiable on the first WTRU, and at least one parameter for instantiating the selected edge computing application ⌐~ 2301

FIG. 20

METHODS, ARCHITECTURES, APPARATUSES AND SYSTEMS FOR MULTIACCESS EDGE COMPUTING APPLICATIONS ON WIRELESS TRANSMIT-RECEIVE UNITS

CROSS-REFERENCE TO RELATED APPLICATION

This application is a U.S. National Stage Application under 35 U.S.C. 371 of International Patent Application No. PCT/US2022/029222, filed 13 May 2022, which claims the benefit of U.S. Provisional Patent Application No. 63/188, 042 filed May 13, 2021, which is incorporated herein by reference in its entirety.

TECHNICAL FIELD

The present disclosure is generally directed to the fields of communications, software and encoding, including, for example, to methods, architectures, apparatuses, systems directed to Multi-access Edge Computing, MEC, applications on Wireless Transmit-Receive Units, WTRUs.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref") in the FIGs. indicate like elements, and wherein:

FIG. 13 is a table including a data structure for a list of exposed MEC capabilities;

FIG. 14 is a table including a data structure of a created MEC capabilities registered at a MEC system;

FIG. 15 is a table including a data structure of an extended application list;

FIG. 16 is a table including a data structure of a list of available user applications;

FIG. 17 is a table including a data structure of an application context;

FIG. 19 is a flow chart of a method according to an embodiment, implemented by a first WTRU; and FIG. 20 is a flow chart of a method according to an embodiment, implemented by a second WTRU.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

Figure 1A:
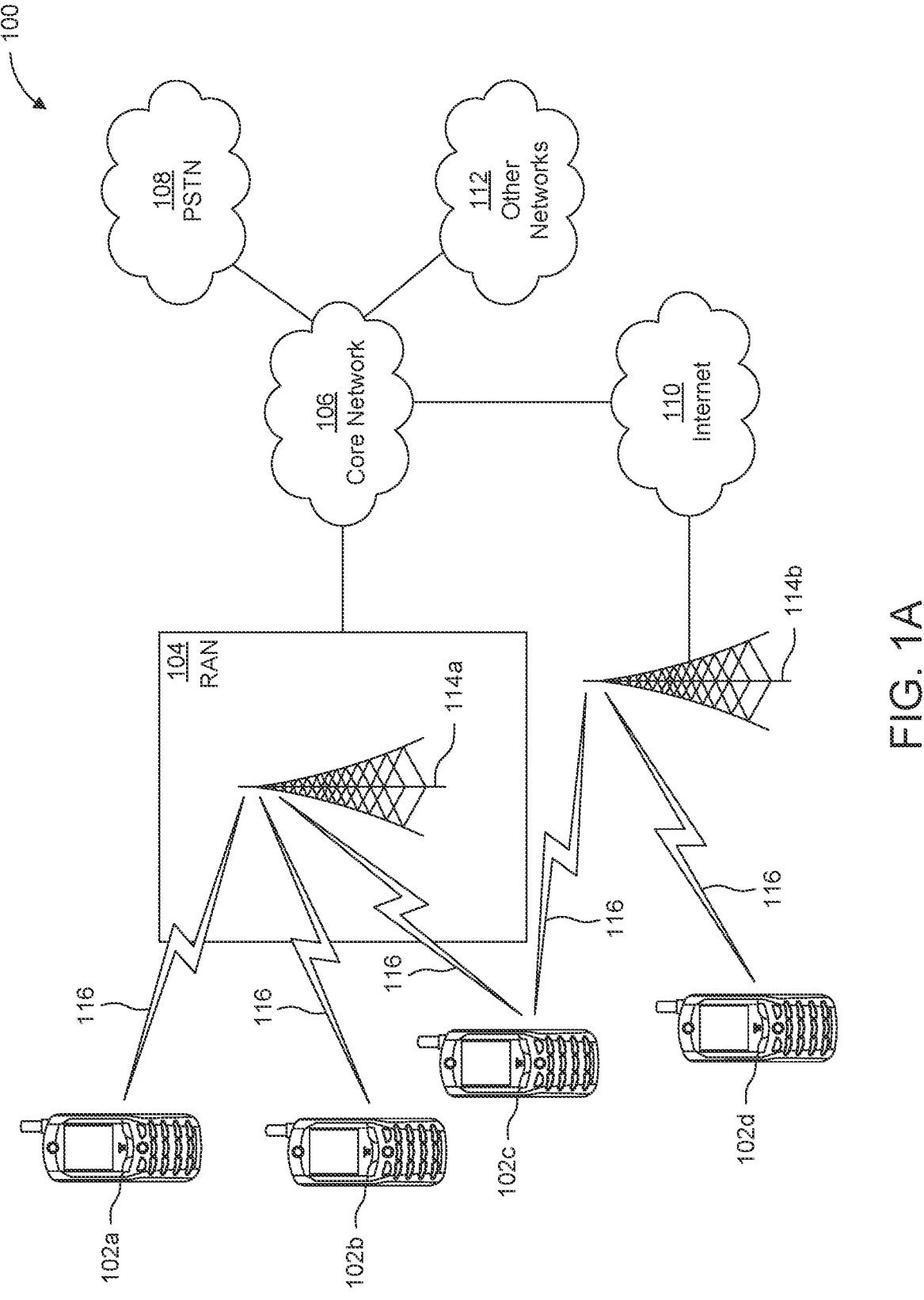
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
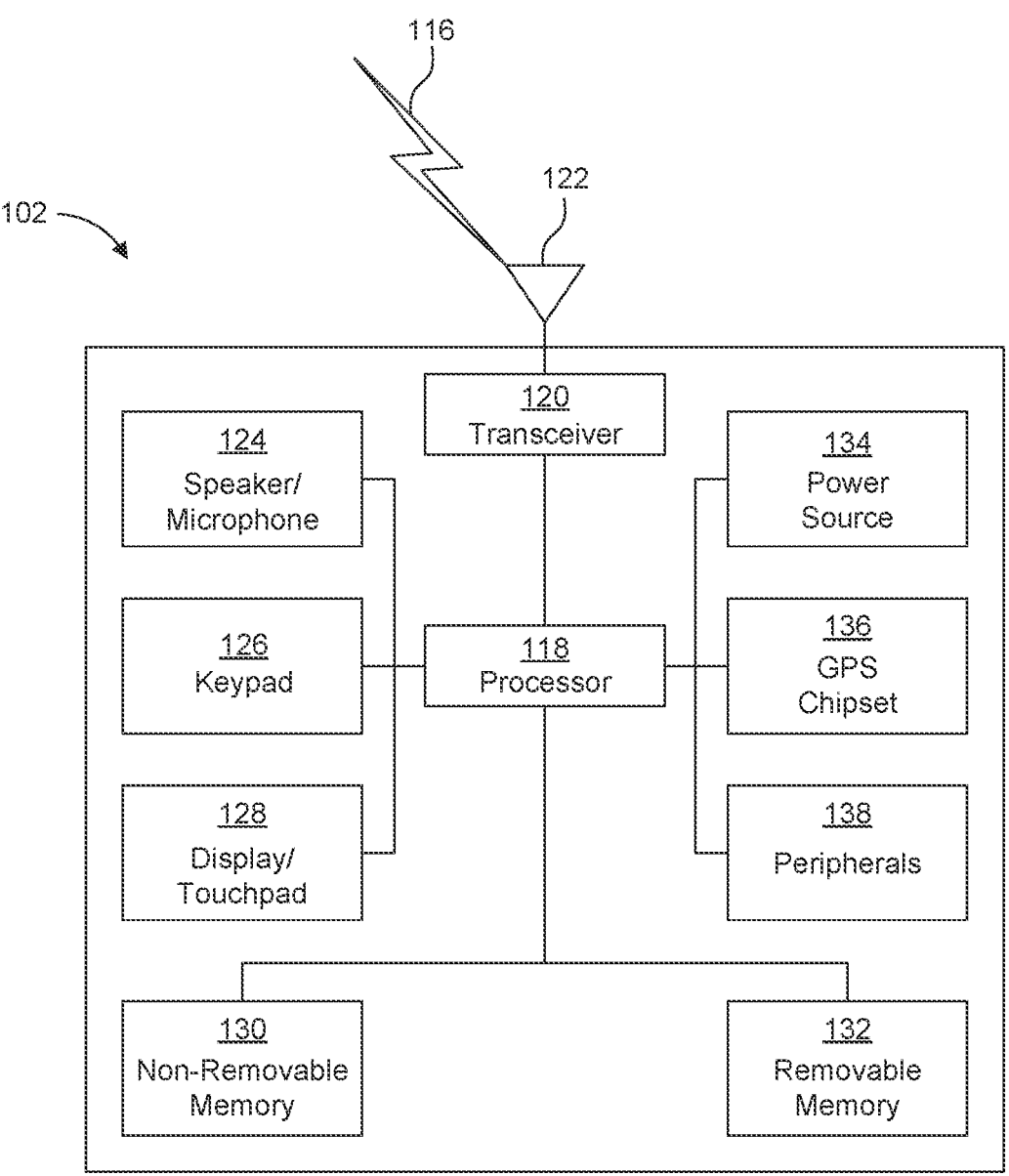
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
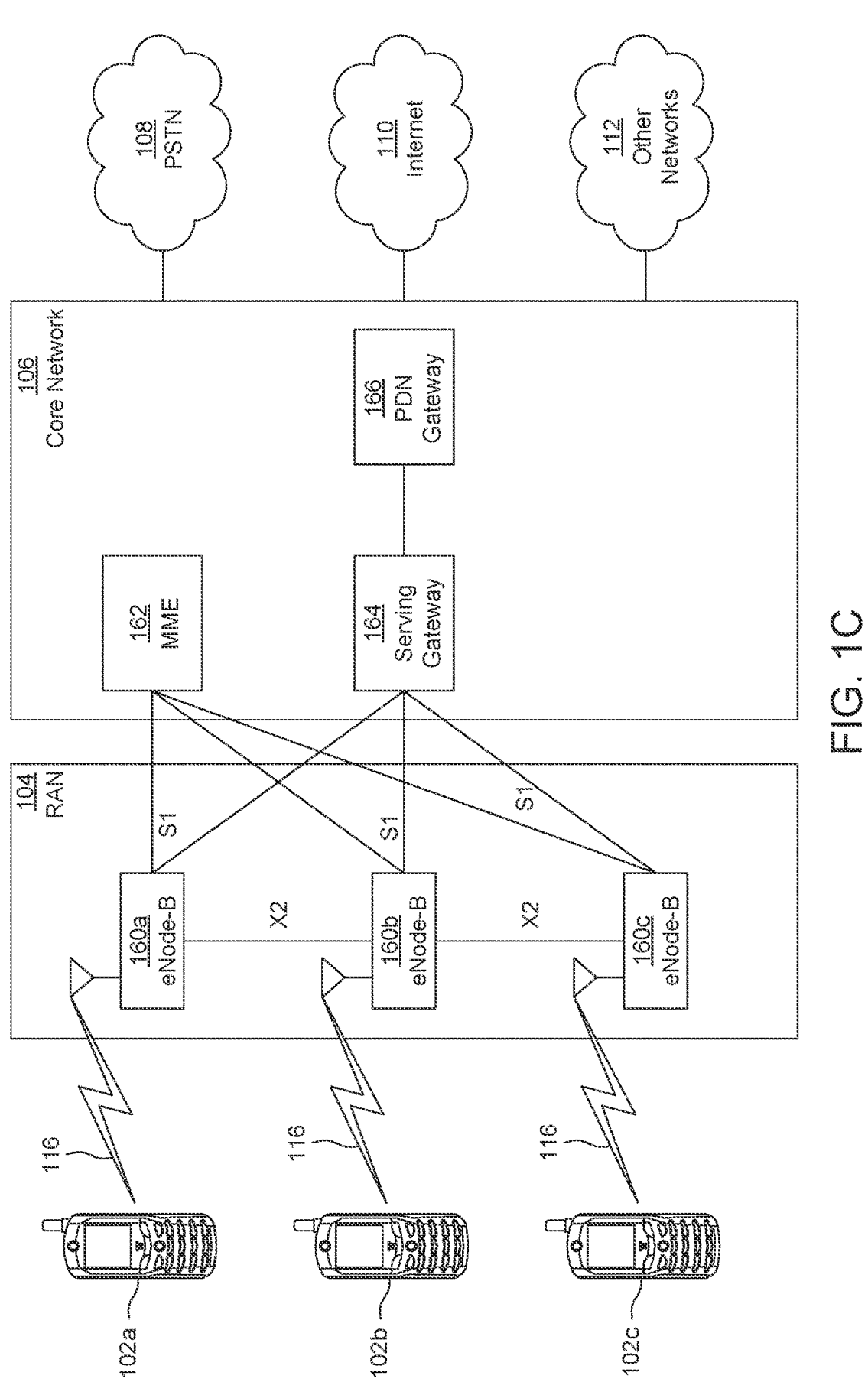
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
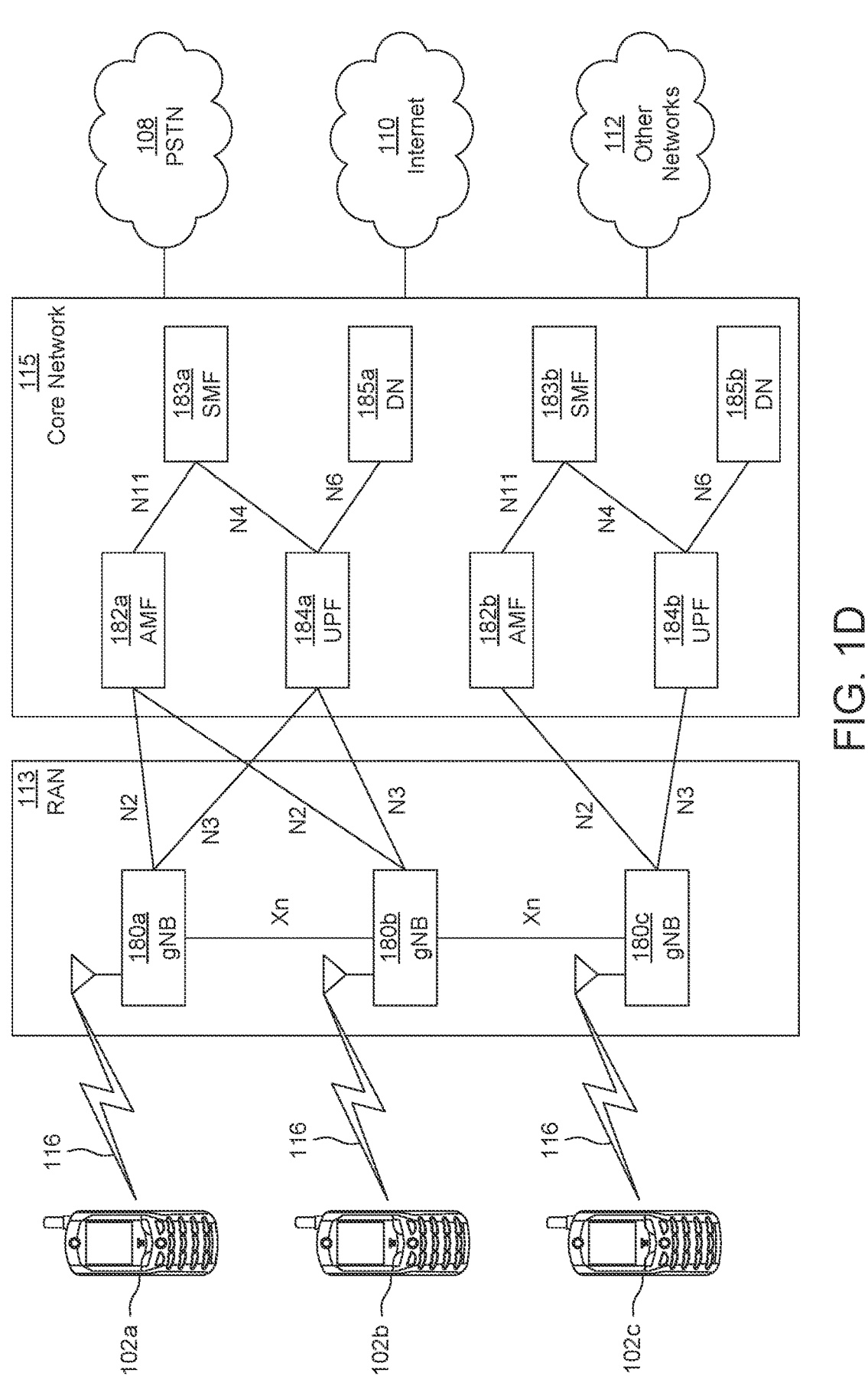
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In anon-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-ID, and the corresponding description of FIGS. 1A-ID, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/ device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

Multi-Access Edge Computing

Figure 2:
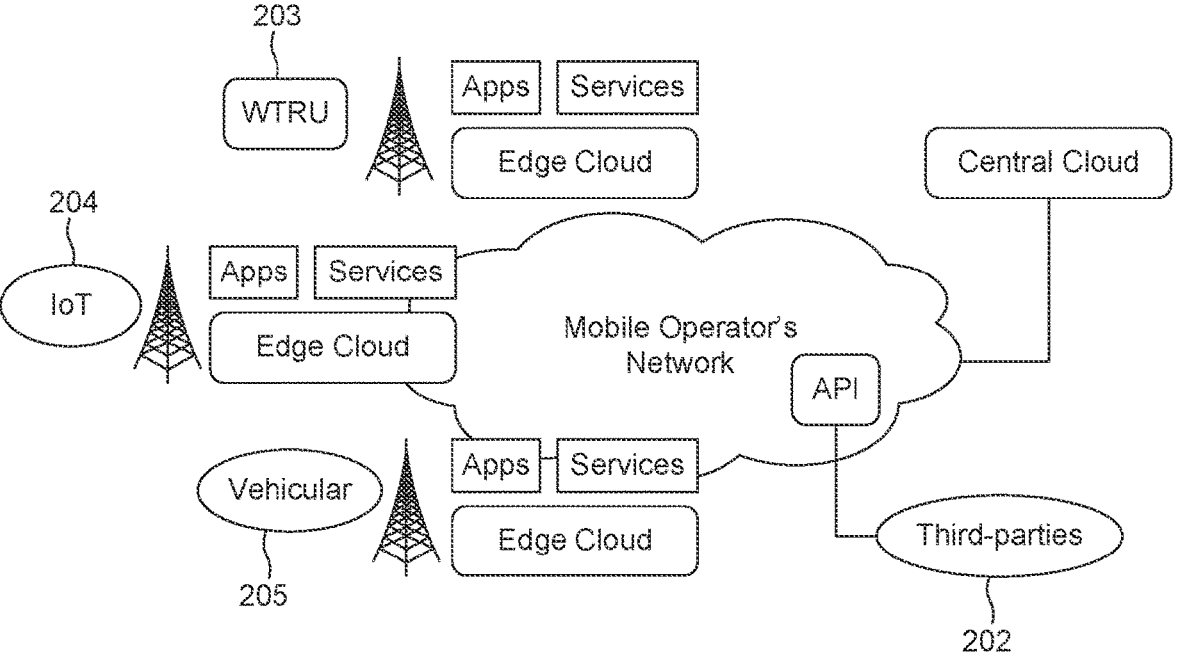
FIG. 2 is a diagram illustrating concepts related to Multi-access Edge Computing (MEC), formerly known as Mobile Edge Computing.

Referring to FIG. 2, Multi-access Edge Computing (MEC), formerly known as Mobile Edge Computing, capabilities deployed in the edge of the mobile network 201 can facilitate the efficient and dynamic provision of services to mobile users, exploiting applications and services on devices such as WTRU 203, Internet of Things (IoT) devices 204, and vehicular devices 205. The European Telecommunications Standards Institute Industry Specification Group for MEC (ETSI-ISG-MEC or ETSI-MEC in short) working group, operative from end of 2014, intends to specify an open environment for integrating MEC capabilities with service providers' networks (e.g., 201), including also applications from third parties 202. These distributed computing capabilities will make available IT infrastructure as in a cloud environment for the deployment of functions in mobile access networks.

Figure 3:
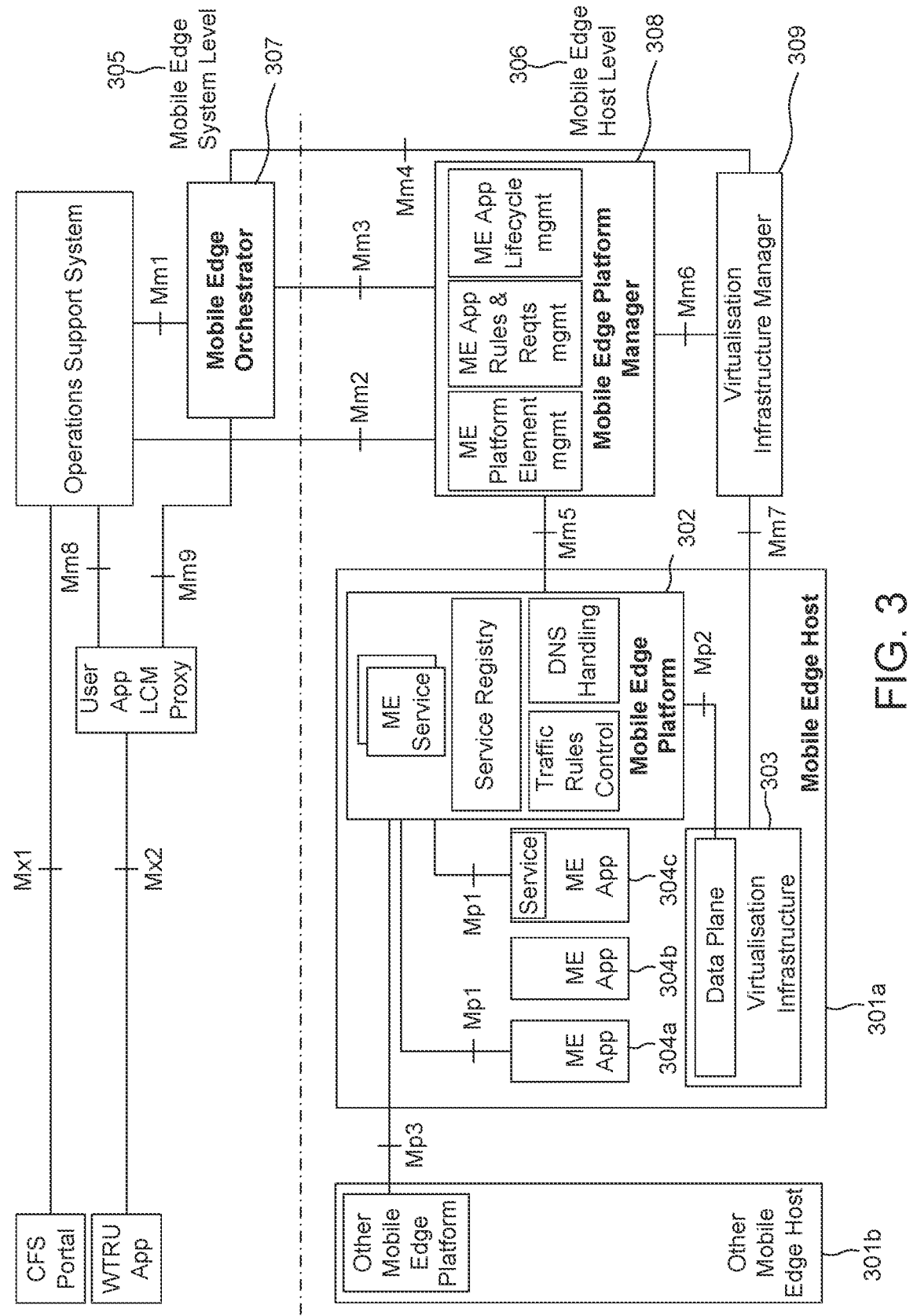
FIG. 3 is a function diagram illustrating the ETSI MEC reference architecture.

The ETSI MEC reference architecture with the functional elements that comprise the mobile edge system and the reference points between them is shown in FIG. 3.

There are three groups of reference points defined between the system entities:

Reference points regarding the mobile edge platform functionality (Mp);

Management reference points (Mm); and

Reference points connecting to external entities (Mx).

The mobile edge system consists of the mobile edge hosts 301a, 301b, and the mobile edge management necessary to run mobile edge applications within an operator network or a subset of an operator network.

The mobile edge host is an entity that contains a mobile edge platform 302 and a virtualization infrastructure 303 which provides compute, storage, and network resources, for the purpose of running mobile edge applications 304a, 304b, 304c.

The mobile edge platform 302 includes the collection of functionalities for running mobile edge applications on a particular virtualization infrastructure and enable them to provide and consume mobile edge services.

Mobile edge applications are instantiated on the virtualization infrastructure of the mobile edge host based on configuration requests validated by the mobile edge management.

The mobile edge management comprises the mobile edge system level 305 management and the mobile edge host level 306 management.

The mobile edge system level management includes the mobile edge orchestrator 307 as its core component, which has an overview of the complete mobile edge system.

The mobile edge host level management comprises the mobile edge platform manager 308 and the virtualization infrastructure manager 309, and handles the management of the mobile edge specific functionality of a particular mobile edge host and the applications running on it.

The ETSI MEC has approved a new work item aiming at studying how terminal units, mobile hosts and personal devices can be used to support cloud computing at the edge. Deployment of MEC in 5G The ETSI MEC ISG illustrates and explains ways to deploy and integrate MEC in the 5G architecture, focusing "on the opportunities for MEC to benefit from the edge computing enablers of the 5G system specification, and for 3GPP ecosystem to benefit from the MEC system and its APIs as a set of complementary capabilities to enable applications and services environments in the very edge of mobile networks."

Figure 4:
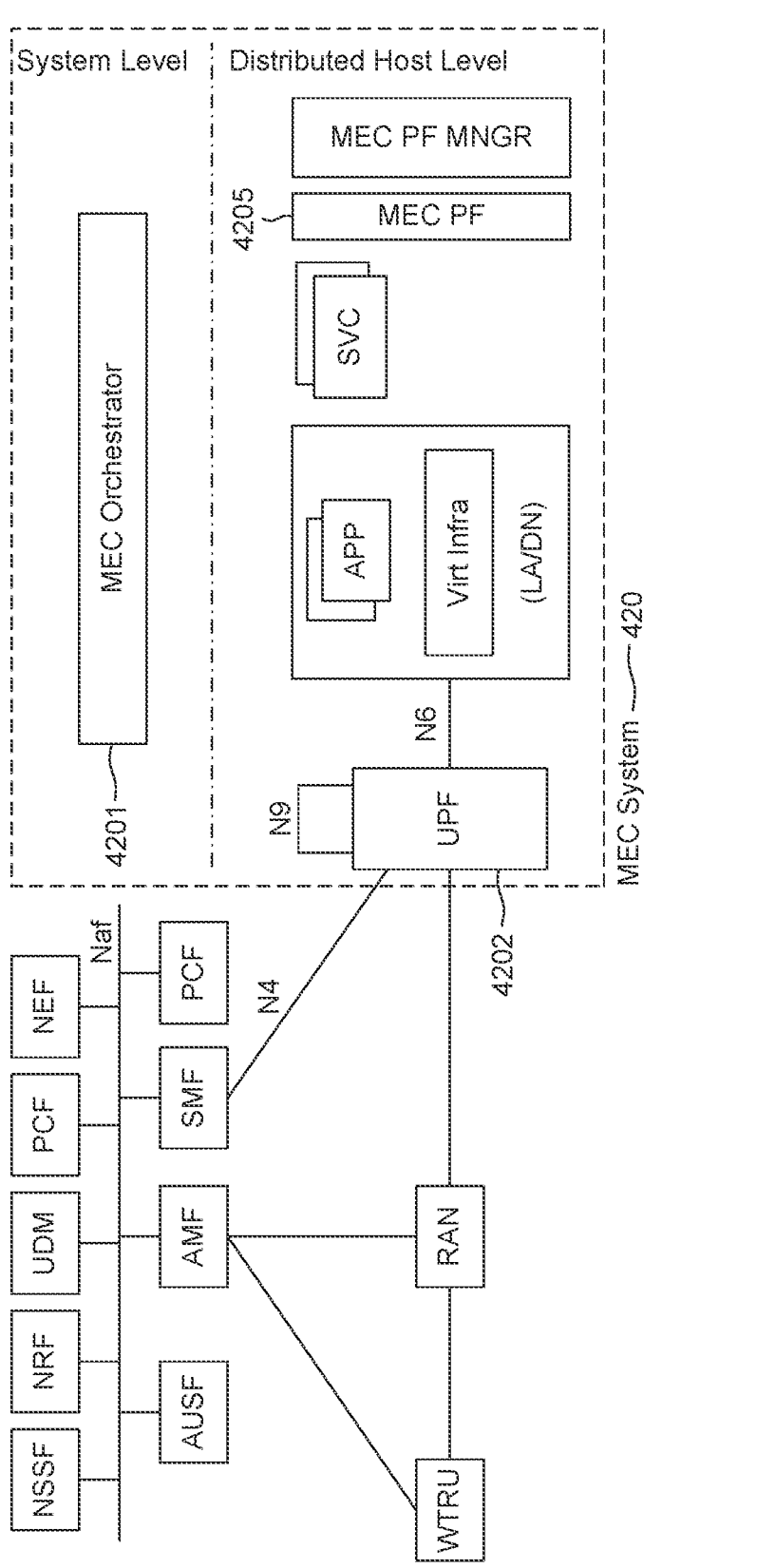
FIG. 4 is a function diagram illustrating integrated MEC deployment in a 5G network.

The design approach taken by 3GPP allows the mapping of MEC onto Application Functions (AF) that can use the services and information offered by other 3GPP network functions based on the configured policies. In addition, a number of enabling functionalities were defined to provide flexible support for different deployments of MEC and to support MEC in case of user mobility events. The ETSI MEC whitepaper proposes to deploy MEC in an integrated manner with 5G, as shown in FIG. 4. In the MEC system 420 on the right-hand side of the MEC orchestrator 4201 is a MEC system level functional entity that, acting as an AF, can interact with the Network Exposure Function (NEF) 405, or in some scenarios directly with the target 5G NFs. On the MEC host level it is the MEC platform 4205 that can interact with these 5G NFs, again in the role of an AF. The MEC host, i.e., the host level functional entities, are most often deployed in a data network in the 5G system. While the NEF as a Core Network function is a system level entity deployed centrally together with similar NFs, an instance of NEF can also be deployed in the edge to allow low latency, high throughput service access from a MEC host. The white paper also assumes that MEC is deployed on the N6 reference point, i.e., in a data network external to the 5G system.

Different MEC deployment scenarios are also identified. Logically MEC hosts are deployed in the edge or central data network and it is the User Plane Function (UPF) 4202 that takes care of steering the user plane traffic towards the targeted MEC applications in the data network. In terms of physical deployment of MEC hosts, there are multiple options identified by the ETSI MEC ISG:

MEC and the local UPF collocated with the Base Station;

MEC collocated with a transmission node, possibly with a local UPF;

MEC and the local UPF collocated with a network aggregation point; and

MEC collocated with the Core Network functions (i.e., in a same data center).

MEC in Constrained Devices

The ETSI MEC has launched a study item, which will study how terminal units, mobile hosts and personal devices can be used to support cloud computing at the edge. According to ETSI MEC, the study will focus on these aspects:

Limited availability of compute resources for running MEC applications and its impact on life cycle management of VMs, Containers or other form of virtual instances;

Mobility of constrained terminals impacting reachability of MEC applications, maintenance of reasonable connectivity, device availability and discovery of appropriate services;

Impact of unavailability of reliable high bandwidth backhaul connectivity (e.g., wired or wireless); and Security and authorization to use a constrained terminal, privacy of user data Applicability of MEC Specification to support cloud computing on such constrained environment will be studied.

There are different scenarios where it is advantageous to enable a reduced capability MEC platform (Constrained MEC, cMEC) for deployment on constrained devices, thus allowing MEC apps to be instantiated on these constrained devices. In this disclosure, we focus on the specific case of a WTRU being the host of a reduced capability MEC platform.

There are different use cases that would benefit from such a deployment scenario, including but not limited to the following:

Vehicular scenarios, where a WTRU embedded in a vehicle might run applications for other neighboring WTRUs (e.g., in platooning situations) or for the edge network (for safety and traffic efficiency applications);

Industry 4.0 scenarios, where mobile robots or robot arms can also host MEC applications to minimize the latency required by certain use cases; and Home gaming scenarios, where cloud-based gaming applications using AR/VR might need ultra-low latencies and/or extended computational capabilities, which can be provided by WTRUs at the same household.

The above listed deployment scenarios will benefit if WTRUs could host Reduced Capability MEC devices and are allowed to host and run MEC applications dynamically, enabling WTRUs to consume these applications without relying fully on an infrastructure/Telco Edge. WTRUs might be connected to a RAW-enabled network, enabling WTRU-to-WTRU traffic to enjoy the reliability and availability that MEC apps often require.

Reliable and Available Wireless (RAW)

Based on time, resource reservation, and policy enforcement by distributed shapers, Deterministic Networking provides the capability to carry specified unicast or multicast data streams for real-time applications with extremely low data loss rates and bounded latency, so as to support time-sensitive and mission-critical applications on a converged enterprise infrastructure.

Wireless operates on a shared medium, and transmissions cannot be fully deterministic due to uncontrolled interferences, including self-induced multipath fading. RAW (Reliable and Available Wireless) is an effort to provide Deterministic Networking on across a path that include a wireless interface. RAW provides for high reliability and availability for IP connectivity over a wireless medium. The wireless medium presents significant challenges to achieve deterministic properties such as low packet error rate, bounded consecutive losses, and bounded latency. RAW extends the DetNet Working Group concepts to provide for high reliability and availability for an IP network utilizing scheduled wireless segments and other media, e.g., frequency/time-sharing physical media resources with stochastic traffic: IEEE Std. 802.15.4 time-slotted channel hopping (TSCH), 3GPP 5G ultra-reliable low latency communications (URLLC), IEEE 802.11ax/be, and L-band Digital Aeronautical Communications System (LDACS), etc. Similar to DetNet, RAW technologies aim at staying abstract to the radio layers underneath, addressing the Layer 3 aspects in support of applications requiring high reliability and availability.

RAW separates the path computation time scale at which a complex path is recomputed from the path selection time scale at which the forwarding decision is taken for one or a few packets. RAW operates at the path selection time scale.

The RAW problem is to decide, amongst the redundant solutions that are proposed by the Patch Computation Element (PCE), which one will be used for each packet to provide a Reliable and Available service while minimizing the waste of constrained resources. To that effect, RAW defines the Path Selection Engine (PSE) that is the counterpart of the PCE to perform rapid local adjustments of the forwarding tables within the diversity that the PCE has selected for the Track. The PSE enables to exploit the richer forwarding capabilities with Packet (hybrid) ARQ, Replication, Elimination and Ordering (PAREO), and scheduled transmissions at a faster time scale.

In RAN QoS QoS flows are handled as data radio bearers or logical channels in NR MAC layer. The gNB is able to assign dynamically assign DL and UL radio resources to users, indicating the resources as DL assignments or UL grants via control channel to the WTRU. Radio resources are defined as blocks of OFDM symbols in spectral domain and time domain. Different lengths are supported in time domain, i.e., (multiple) slot or mini-slot lengths. Resources of multiple frequency carriers can be aggregated and jointly scheduled to the WTRU. Scheduling decisions are based, e.g., on channel quality measured on reference signals and reported by the WTRU (cf. periodical CSI reports for DL channel quality). The transmission reliability can be chosen in the scheduling algorithm, i.e., by link adaptation where an appropriate transmission format (e.g., robustness of modulation and coding scheme, controlled UL power) is selected for the radio channel condition of the WTRU. Retransmissions, based on HARQ feedback, are also controlled by the scheduler. If needed to avoid HARQ round-trip time delays, repeated transmissions can be also scheduled beforehand, to the cost of reduced spectral efficiency. In dynamic DL scheduling, transmission can be initiated immediately when DL data becomes available in the gNB.

Overview

Figure 5:
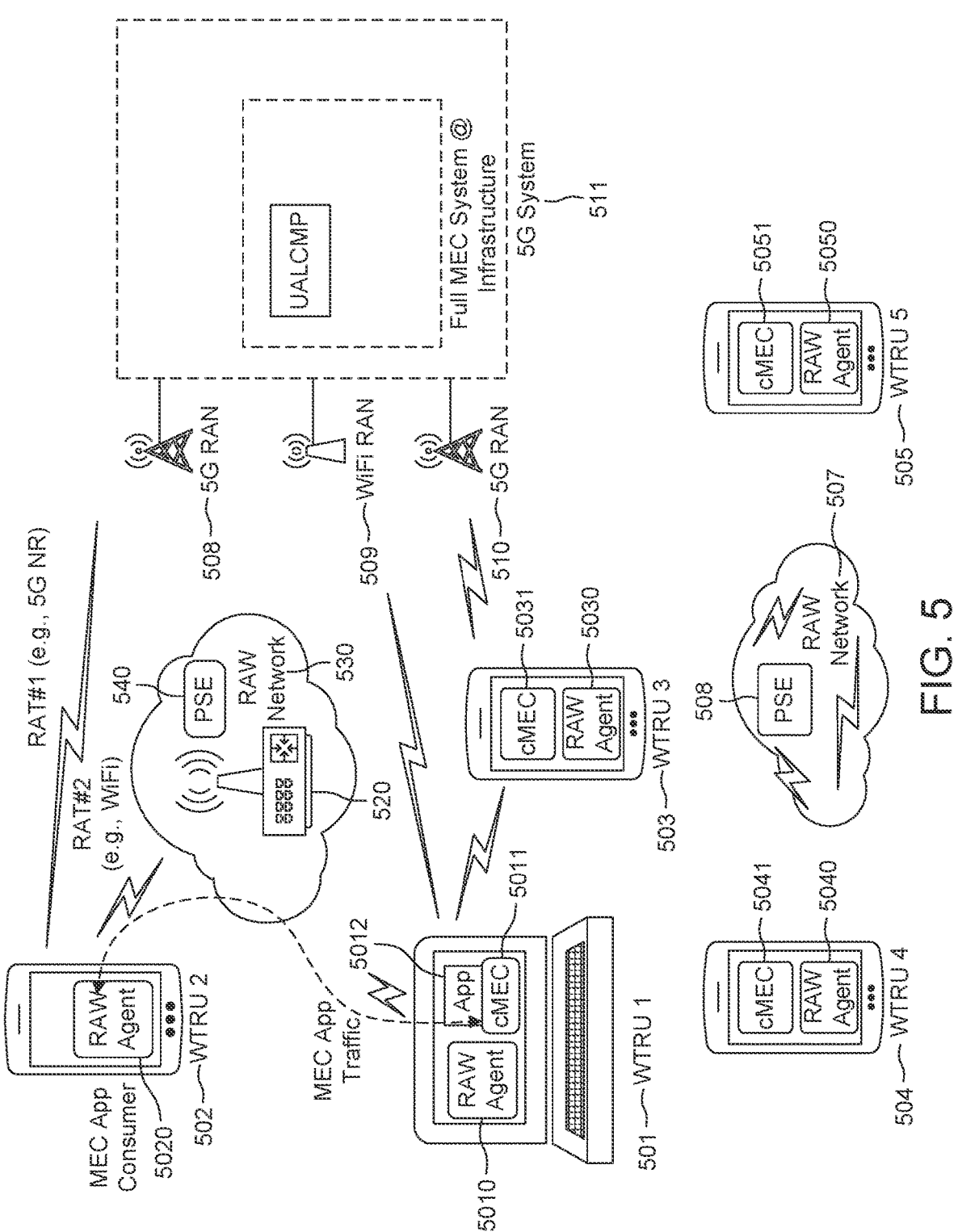
FIG. 5 is an example scenario where multiple WTRUs are connected to the network via 5G base stations or WLAN access points.

Considering the scenario depicted in FIG. 5, there are multiple WTRUs 501, 502, 503, 504, 505 connected to the network via 5G base stations 508, 510 or WLAN access points 509, 520. The WTRUs may also be communicating in a direct mode (i.e., WTRU-to-WTRU). The WTRUs may be all connected to a RAW-capable network 507. Some WTRUs 501, 503, 504, 505 are enabled with a reduced capability MEC platform (Constrained MEC, cMEC) 5011, 5031, 5041, 5051 respectively, where applications may be instantiated. A full MEC system 511—connected to the mobile operator's network—may contain all the logical components defined by the ETSI MEC architecture, meaning one or multiple MEC hosts plus all the management system level components (e.g., orchestrators, OSS, etc.).

WTRUs connected to a RAW capable network have RAW agents/controllers 5010, 5020, 5030, 5040, 5050 that take care of properly configuring the path forwarding according to what the PSE dictates (either using in-band or out-band signaling). Note that a RAW-capable network might use one or multiple RATs simultaneously (e.g., WiFi and 5G-NR). Even if we are depicting two different RAW clouds 507, 530 in FIG. 5, each with a different PSE 508, 540 respectively, it might also be that they are the same logical RAW-capable network.

The integration of the RAW network in the above scenario is optional. It offers reduced latencies and increased service availabilities (e.g., in scenarios of limited cellular coverage). This is also noteworthy that in the above scenario, a WTRU may request the instantiation and consume a MEC application 5012 running on a neighboring WTRU even when one or both WTRUs don't have connectivity to the network infrastructure/Telco Edge.

At the time of writing of the present disclosure, standardized solutions by ETSI MEC do not support for a WTRU to host constrained MEC resources and onboard MEC apps for direct consumption by other neighboring WTRUs. The present disclosure addresses, among others, the gap of enabling a WTRU to learn about neighboring WTRUs hosting a cMEC (of any sort), and instantiating MEC apps on these cMEC-capable WTRU hosts. This gap includes, among others, the following problems:

How to enable a WTRU hosting a cMEC to advertise its capabilities to other neighboring WTRUs (with and without support from a full MEC system running in the infrastructure/Telco Edge);

How to enable a WTRU to learn about cMECs available at neighboring WTRUs (with and without support from a full MEC system running in the infrastructure/Telco Edge);

How to enable a WTRU to directly request the instantiation of a MEC app on a cMEC hosted by another WTRU (without the involvement of a full MEC system running in the infrastructure/Telco Edge, and therefore even if there is no connectivity to it); and How to enable WTRU-to-WTRU MEC app traffic to benefit from RAW capabilities to guarantee SLAs.

A 3GPP and MEC deployment may be assumed, and therefore the term WTRU is not limited to a mobile phone terminal (other, non-exclusive examples include a 3GPPP connected car or a robot/drone). The embodiments described in this disclosure would be also applicable to non-3GPP MEC deployments.

EMBODIMENTS

The embodiments described herein define a logical component which may be further referred to as a "constrained MEC User Application LifeCycle Management Proxy" (cUALCMP). This is along with extensions to the Mx2 interface of the MEC architecture, and signaling procedures in order to, for example:

Enable a WTRU to selectively expose its (constrained) MEC capabilities to other neighboring WTRUs;

Enable WTRUs to discover and instantiate MEC apps on other WTRUs; and

Enable WTRUs to request the required reliability and availability guarantees by the MEC app traffic.

Figure 6:
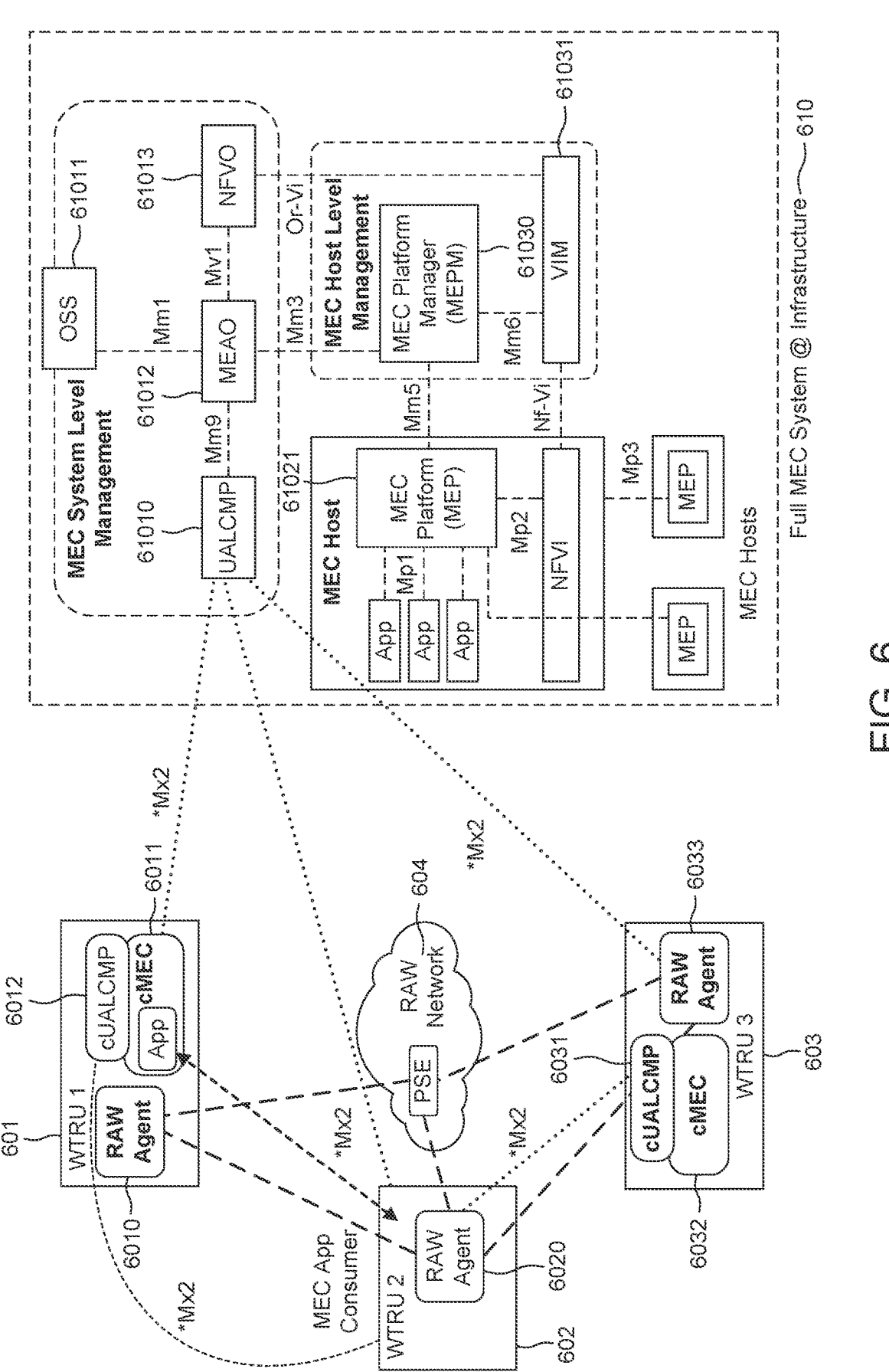
FIG. 6 is an architecture according to an embodiment including a constrained MEC (cMEC) and constrained User Application LifeCycle Management Proxy (cUALCMP)

FIG. 6 shows an architecture according to an embodiment. WTRUs 601, 603 hosting a cMEC 6011, 6032 respectively, for running MEC apps autonomously (i.e., without being integrated with a full MEC system 610 running at the infrastructure/Telco Edge) include the new cUALCMP component 6012, 6031 respectively, terminating an extended Mx2 interface, marked as Mx2 preceded by an asterisk, i.e., *Mx2. WTRUs 601, 602, 603, may also have a RAW agent (also referred to as RAW controller/ctrl) 6010, 6020, 6033 respectively, responsible for terminating the RAW control plane interface. There are several candidate approaches being discussed at the IETF at the time of writing of the present disclosure, and this disclosure is not limited to any particular protocol. The availability of a RAW network 604 connecting the WTRUs 601, 602, 603, is optional and enables additional features. Additionally, there is a full MEC system 610, which may include a MEC platform (MEP) 61021, a MEC platform manager (MEPM) 61030, a MEC Application Orchestrator (MEAO) 61012, an NFV Orchestrator (NFVO) 61013, a VIM 61031, an OSS 61011 and a UALCMP 61010, which may be extended to understand the extensions of the new *Mx2 interface. Note that these extensions would only be needed to enable the MEC system to act as a repository of cMEC-enabled WTRUs.

WTRU Exposing its cMEC Capabilities to Other WTRUs

Here it is described how a WTRU hosting a cMEC capable of instantiating MEC apps without being integrated with a full MEC system, may expose/advertise its capabilities to other neighboring WTRUs. Two different, non-exclusive approaches are described: with and without support from a full MEC system running at the infrastructure/Telco Edge.

WTRU Exposing its cMEC Capabilities to Other WTRUs: Via a Full MEC System

Figure 7:
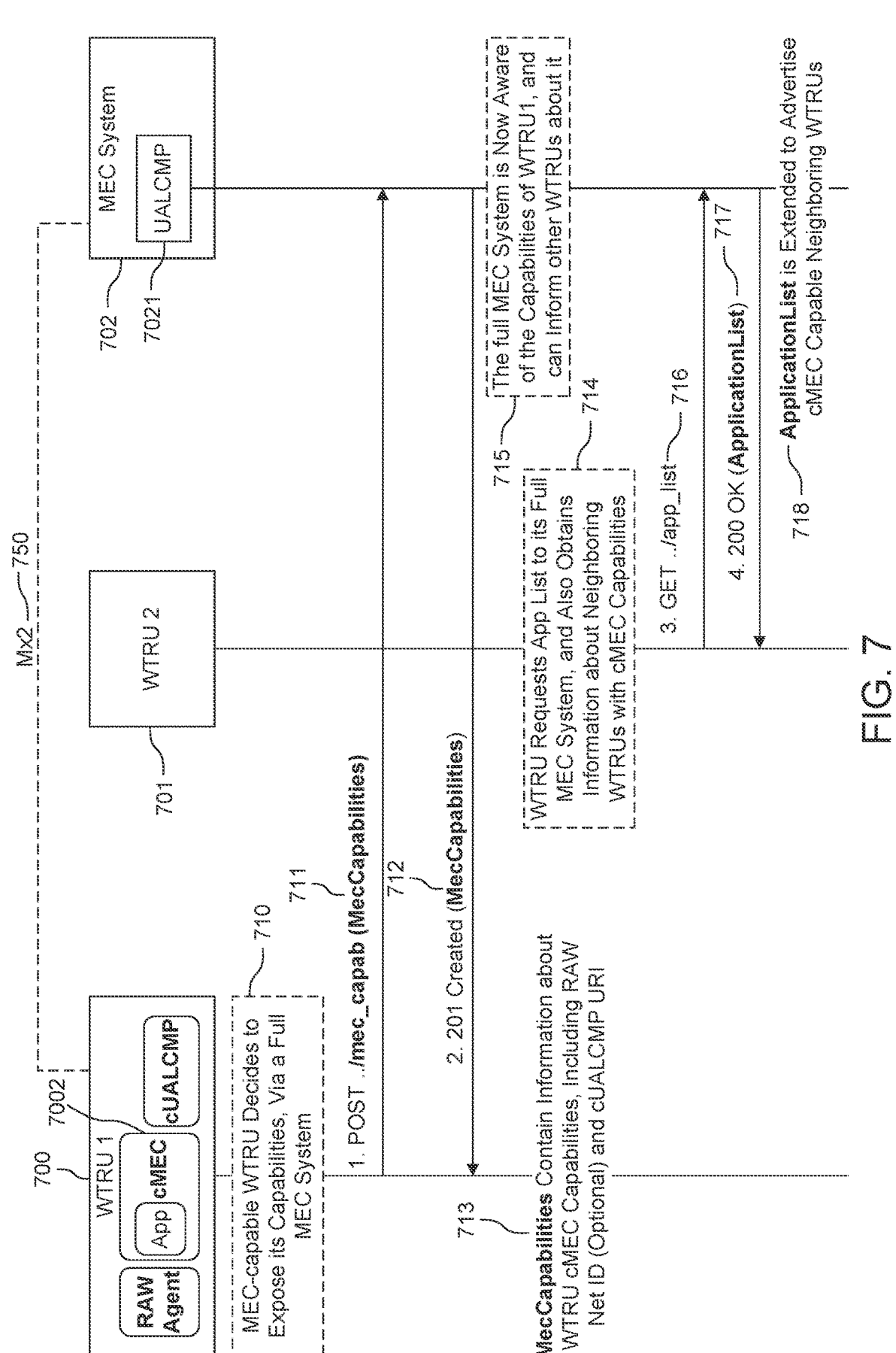
FIG. 7 is a sequence chart of an embodiment where a WTRU exposes its cMEC capabilities to other WTRUs via a full MEC system.

FIG. 7 shows an exemplary sequence diagram. Each of the steps illustrated in the FIG. 7 is indicated by an integer number (1-4) in the figure.

Step 1: a cMEC capable WTRU (e.g., WTRU 1 700) may send a new POST ../mec_capab message 711 over the Mx2 interface 750 as defined by ETSI MEC at the time of writing of the present disclosure, to the full MEC system 702, the Mx2 interface being extended (further indicated as (*Mx2) according to embodiments. This new message 700 contains the information about the cMEC capabilities that the WTRU 700 has decided to expose, 710. The message body may contain one or more elements of the data structure for the list of exposed MEC capabilities, as specified in FIG. 13. In FIG. 13, the '>' and '>>' signs refer to hierarchy levels and are used as in ETSI MEC specifications. The MecCapabilities may contain information about WTRU cMEC capabilities, including an optional RAW net ID and cUALCMP URI, 713. The data structure in FIG. 13 includes, for a WTRU, MEC capabilities, i.e., a list data structure of 0 . . . N device MEC capabilities available to the MEC system in the WTRU (according to embodiments, a WTRU may have 0 to N different flavors of MEC capabilities); and for each of the 0 . . . N device MEC capabilities, a ueMecInfo data structure, comprising at least one of:

validityTime (optional), the time how long the ueMecInfo information is valid;

ueLocation (optional), a geolocation, may be used by WTRUs to select a cMEC for instantiating an application, or by the full MEC system, to filter which cMECs are advertised by it;

ueId, an identifier of the WTRU cMEC. The attribute may be unique within the scope of the network and MEC systems involved;

ueMECDescription, human-readable description of the (c)MEC;

ueBatteryLifeTime (optional), expected remaining battery lifetime, may be e.g., 0 when not running on battery power;

mx2URI (optional), address of the cUALCMP exposed interface; and rawNetId (optional), identifier of RAW-capable network the WTRU is attached to. May be absent if the WTRU is not connected to a RAW-capable network or the WTRU is not RAW-capable.

Step 2 (FIG. &): the UALCMP 7021 of the full MEC system 702 may record the exposed cMEC 7002 hosted by the WTRU 700 and may return the 201 Created response 712 to the WTRU 700 with the message body possibly containing one or more elements of the data structure of the created MEC capabilities registered at the MEC system 702, as specified in FIG. 14. The full MEC system 702 is now aware of the capabilities of WTRU 700, and can inform other WTRUs about it, 715. In FIG. 14, the mecCapabilities data structure is a list of 0 . . . N device MEC capabilities available to the MEC system; each of the 0 . . . N device MEC capabilities comprises a ueMECInfo data structure, wherein each of the ueMECInfo data structures comprises 0 . . . 1 validityTime, i.e., a time/duration until when/how long the information in the ueMECInfo structure is valid; a ueId, being an identifier of the WTRU's cMEC. The identifier may be unique within the scope of the network and MEC systems involved; and 0 . . . 1 ref erenceURI, being an address of the MEC capabilities context created at the system.

The referenceURl is used by the WTRU in case it wants to update the information about the exposed capabilities.

If any of the capabilities exposed by the WTRU or associated attributes change, or the WTRU may decide to modify them, the created context may be updated/modified by using the PUT ../mec_capab/{mecId} (MecCapabilities). The history of updates of cMEC capabilities exposed by a WTRU might be of potential use too; e.g., the full MEC system 702 may predict availability of resources for specific WTRUs and use that for tailored orchestration.

An example of capabilities update is the change of any of the Mx2 interface URI exposed by the WTRU as a result of mobility; e.g., a change of Point of Attachment leading to a change of the IP address or other type of locator.

Step 3 (FIG. 7): a WTRU (WTRU2) 701, that may be a regular WTRU not hosting any cMEC resources, requests 714, 716 to the UALCMP 7021 at the full MEC system 702 (at the infrastructure/Telco Edge associated to the WTRU) the list of applications available to instantiate on the MEC system, using a regular GET ../app_list. Alternatively, a new API message (such as GET ../cmec_list) may be defined according to an embodiment, to only request the list of known cMECs to the full MEC system 702.

Step 4 (FIG. 7): The UALCMP 7021, in addition to retrieving the list of WTRU applications available to the requesting WTRU, also retrieves the list of available cMECs hosted by neighboring WTRUs. The UALCMP 7021 returns the 200 OK response 717 to the device application, with the message body containing the data structure for the list of available user applications. According to an embodiment, the UALCMP 7021 can make use of an extended Application List 718, including a list of neighboring WTRUs hosting cMECs. This list may be extended to include one or more of the non-limiting examples of new attributes as depicted in FIG. 15. The data structure of FIG. 15 includes a list euMecList structure of 0 . . . N (neighboring) WTRUs known to the full-MEC system for hosting cMEC. The euMecList structure comprises, for each of those 0 . . . N WTRUs an ueMecInfo data structure and an optional application list appList. The ueMecInfo structure comprising:

validityTime (optional), the time how long the ueMecInfo information is valid;

ueLocation (optional), a geolocation, may be used by WTRUs to select a cMEC for instantiating an application, or by the full MEC system, to filter which cMECs are advertised by it;

ue Id, an identifier of the WTRU cMEC. The attribute may be unique within the scope of the network and MEC systems involved;

ueMECDescription (optional), human-readable description of the (c)MEC;

ueBatteryLifeTime (optional), expected remaining battery lifetime, may be e.g., 0 when not running on battery power;

mx2URI (optional), address of the cUALCMP exposed interface; and rawNetId (optional), identifier of RAW-capable network the WTRU is attached to. May be absent if the WTRU is not connected to a RAW-capable network or the WTRU is not RAW-capable.

The appList structure is optional, as mentioned, and may comprise a complete list or a subset of it, applications available at the cMEC.

If the GET ../app_list is not used, but a newly GET ../cmec_list call, the information returned would be also the ueMecList structure as defined in the previous table. WTRU Exposing its cMEC Capabilities to Other WTRUs: Without Interacting with a Full MEC System A WTRU can also expose its cMEC capabilities to neighboring WTRUs without the assistance of a full MEC system running at the infrastructure/Telco Edge. There are several approaches that can be followed, see the following, non-limiting, examples:

Via periodic advertisements piggybacked on layer-3 signaling (e.g., ICMP, neighbor discovery);

Piggybacked in RAW (in-band or out-band) signaling if the WTRU is RAW-capable and is connected to a RAW-capable network. Examples of protocols being considered for RAW include Segment Routing, BIER-TE, IP source routing headers, etc.;

Via periodic UPnP advertisements;

Via layer-2 extensions, such as IEEE 802.11 management frames; and

Via a central entity (database repository) that keeps track of the WTRU's cMEC capabilities, and WTRU can retrieve this information from that central entity. As a non-limiting example, this central entity may be accessed through an application on each WTRU.

Regardless of the used container protocol to distribute the cMEC capabilities of a WTRU, what is relevant is that any of the following pieces of information may be included:

WTRU ID: Identifier of the WTRU cMEC. This attribute may be unique within the scope of the network and MEC systems involved;

Validity time: indicates how long this information is valid;

WTRU Location: Geolocation;

WTRU Battery Lifetime: Expected remaining battery lifetime. 0 if not running on battery power;

Mx2 URI: Address of the cUALCMP exposed interface; and

RAW Network ID: Identifier of RAW-capable network the WTRU is attached to. Absence of the RAW Network ID or the RAW Network ID equaling a NULL value may indicate that the WTRU is attached to a non-RAW capable network. Non-limiting examples of RAW Network IDs are URIs (pointing to the PCE protocol interface of the domain), and domain names.

WTRU Requesting Available Apps to a cMEC@WTRU, Through a Constrained UALCMP@WTRU (cUALCMP@WTRU)

According to an embodiment, the WTRU is augmented with the logical cUALCMP component according to an embodiment, terminating an extended Mx2 interface (*Mx2) according to an embodiment, allowing any other WTRU to request available apps that can be instantiated on the cMEC at the WTRU according to an embodiment.

Figure 8:
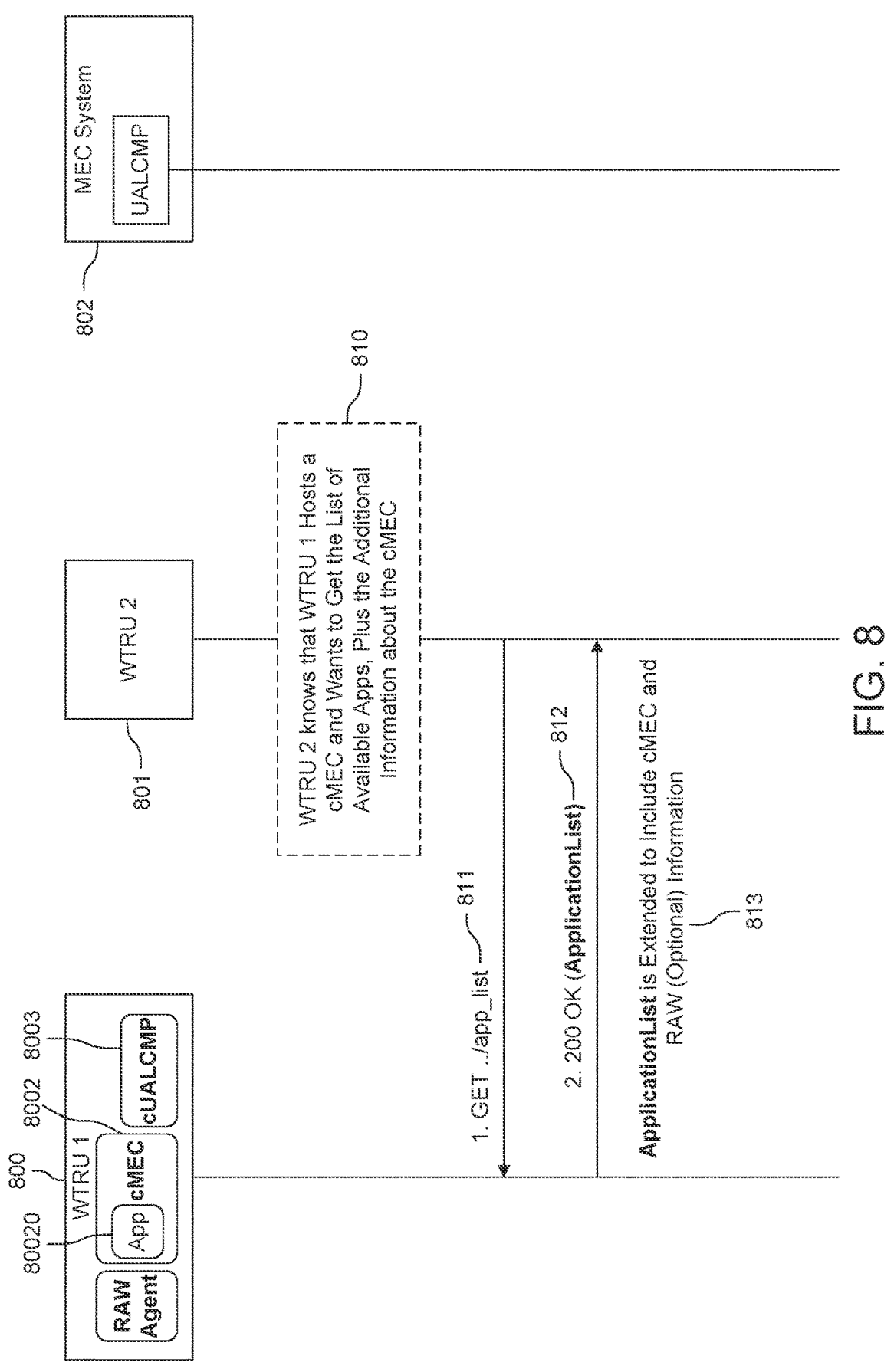
FIG. 8 is a sequence chart of an embodiment where a WTRU requests available applications (apps) to a cMEC in a WTRU, through a cUALCMP in a WTRU.

FIG. 8 shows an exemplary sequence diagram in which WTRU 2 801 knows that WTRU1 800 hosts a cMEC 8002 and wants to get the list of available apps 80020, plus the additional information about the cMEC 8002, 810.

Step 1: WTRU 2 801, requests to the cUALCMP 8003 running at WTRU 1 800, the list of applications available to instantiate on the MEC system 802, using, 811, a regular GET ../app__list. The cUALCMP 8003 running at WTRU 1800, returns 812 the 200 OK response to WTRU 2 801, with the message body containing the data structure for the list of available user applications. The cUALCMP 8003 can make use of an ApplicationList data structure as defined by ETSI MEC at the time of writing, that is extended according to an embodiment, to includes the ueMecInfo structure containing the information about the cMEC 8002. This list is thus extended, 813, to include one or more of the attributes set forth in FIG. 16. The data structure in FIG. 16 comprises an appList data structure (note that ETSI MEC uses the term 'ApplicationList' for the data structure, in which an attribute is called 'appList'), a list 0 . . . N user applications available to the device application as defined below: a ueMecInfo data structure according to an embodiment, comprising:

validityTime (optional), the time how long the ueMecInfo information is valid (optional);

ueLocation (optional), a geolocation, may be used by WTRUs to select a cMEC for instantiating an application, or by the full MEC system, to filter which cMECs are advertised by it;

ue Id, an identifier of the WTRU cMEC. The attribute may be unique within the scope of the network and MEC systems involved;

ueMECDescription (optional), human-readable description of the (c)MEC;

ueBatteryLifeTime (optional), expected remaining battery lifetime, may be e.g., 0 when not running on battery power;

rawNetId (optional), identifier of RAW-capable network the WTRU is attached to. May be absent if the WTRU is not connected to a RAW-capable network or the WTRU is not RAW-capable.

The information returned, 812, by WTRU 1 800, in the ueMecInfo structure may be used by the requesting WTRU 2 801, to decide whether to instantiate a given MEC app (out of the ones available and returned in the appList) on WTRU 1 800, or not. The requesting WTRU may decide to query multiple cMEC-capable WTRUs in parallel and decide which is the most suitable one based on different policies and criteria, such as: availability of the cMEC (including location and battery constraints), reliability and availability of the MEC app traffic, e.g., querying the PSE about the feasibility of setting up the required paths.

WTRU Requesting App Instantiation to a cMEC@WTRU, Through a Constrained UALCMP@WTRU (cUALCMP@WTRU)

Figure 9:
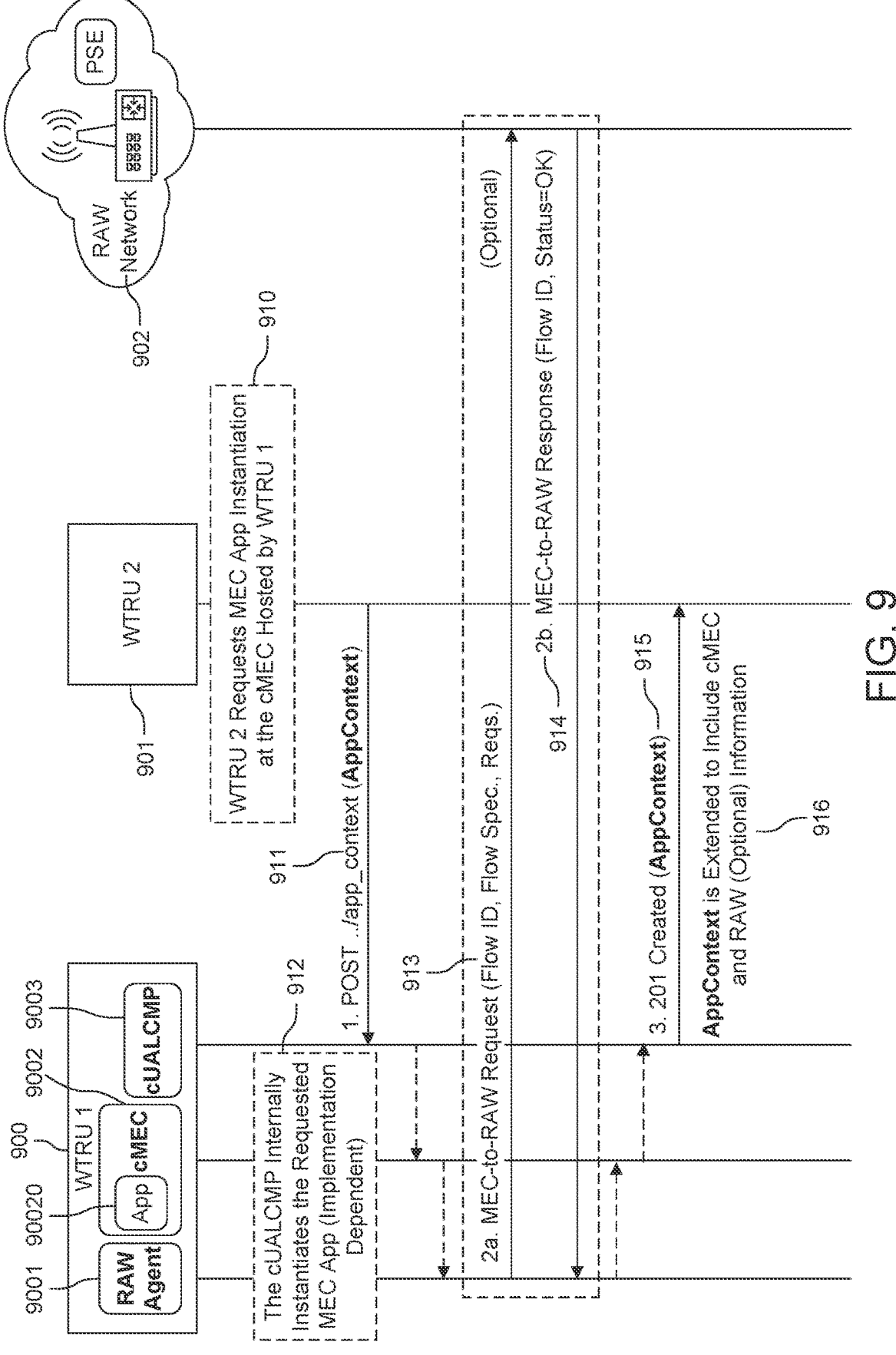
FIG. 9 is a sequence chart of an embodiment where WTRU requests app instantiation to a cMEC in a WTRU, through a cUALCMP in a WTRU.

Procedures are discussed here according to embodiments, that enable a WTRU to request the instantiation of a MEC application at a cMEC hosted by another WTRU, including the configuration of the RAW network. The RAW part is optional and may not be present if the WTRU is not RAW-capable or it is not connected to a RAW-capable network. Referring to the exemplary sequence diagram of FIG. 9:

Step 1: the requesting WTRU (WTRU 2 901) requests, 910, the instantiation of the MEC application by submitting the POST request 911 to the cUALCMP, 9003 to WTRU1, 900. The message body contains the data structure for the application context to be created, which is extended 916 according to an embodiment, to include reliability and availability attributes. Examples of these reliability and availability attributes are:

ensuredLat: the ensured round trip time e.g., in milliseconds.

ensuredBW: the ensured connection bandwidth, e.g., in kbit/s.

ensuredRel: the maximum percentage of packets failed.

ensuredJit: the ensured jitter, e.g., in milliseconds.

Additionally, the application context is also extended according to an embodiment, to include parameters related to the constrained nature of the MEC resources where the app is going to be instantiated (see FIG. 17). The data structure of FIG. 17 may include an appInfo element, comprising one or more of the following elements:

appLifeTime, the requested lifetime of the application; allowing the hosting cMEC to compute if it is willing, and capable of, granting the request;

appMigratable, indicates whether the application can be migrated to another cMEC or not. Example values are:

0: Non-migratable;

1: Migratable, non-transparent (requires intervention of the WTRU consuming the application); and 2: Migratable, transparent (does not require intervention of the WTRU consuming the application).

Step 2 (FIG. 9): the cUALCMP 9003 internally requests, 912, the instantiation of the MEC application 90020 at the hosted cMEC 9002. This procedure is implementation dependent. The cMEC 9002 also may contact a RAW agent 9001 running at the WTRU (if present) to trigger the setup of the required connectivity. The RAW agent may follow known procedures to configure the RAW network to provide the indicated reliability and availability (steps 2a, 913, and 2b, 914).

Step 3: the cUALCMP 9003 returns the 201 Created response, 915, to the WTRU 901 with the message body containing the data structure of the created application context.

Figure 10:
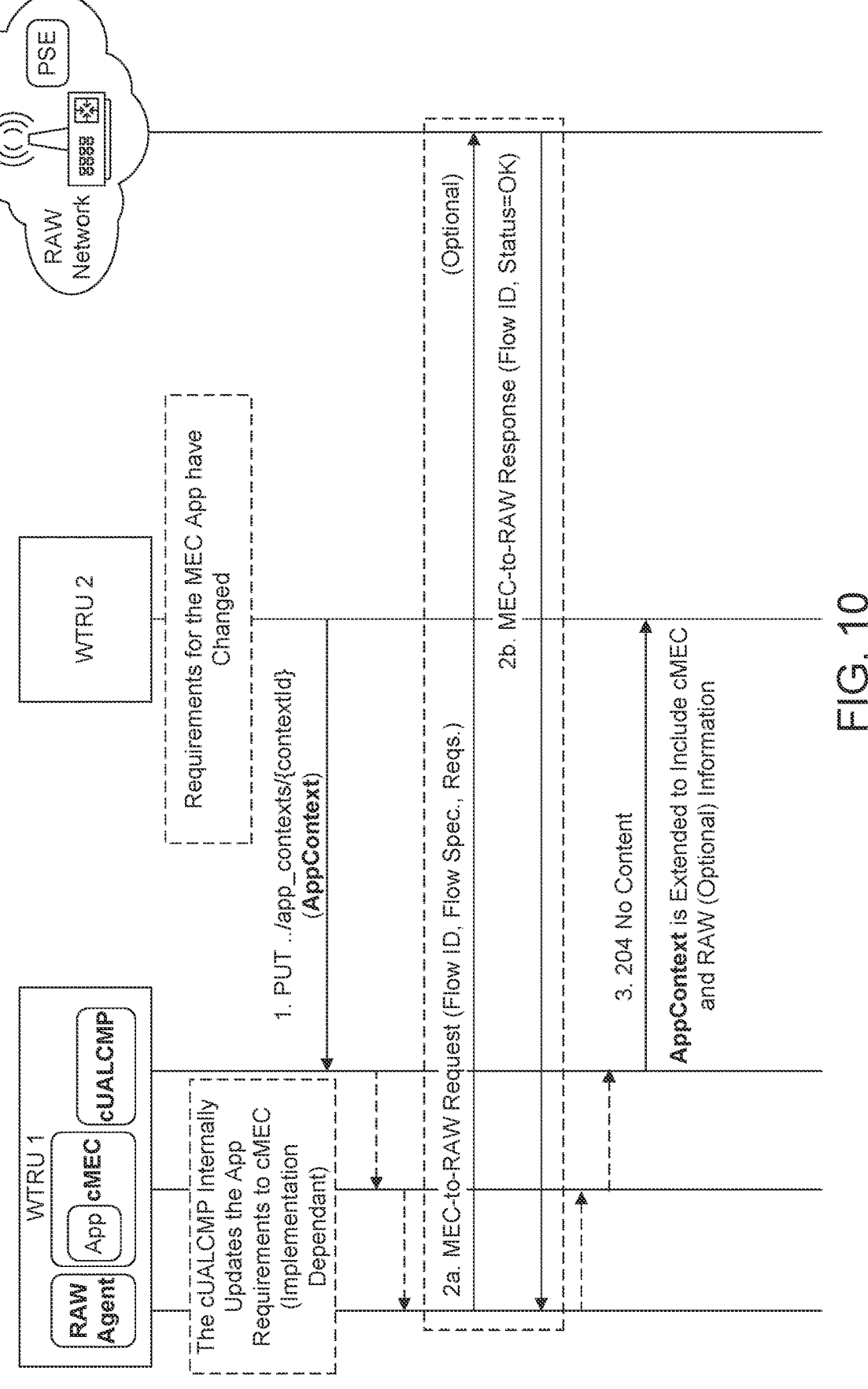
FIG. 10 is a sequence chart of an embodiment where a WTRU requests app context update to a cMEC in a WTRU, through a cUALCMP in a WTRU.

At any point in time the WTRU consuming a MEC application can also request an update of the application context, for example because there has been a change in the requirements (e.g., regarding the resources or connectivity). The procedure to update the application context is described in FIG. 10.

Figure 11:
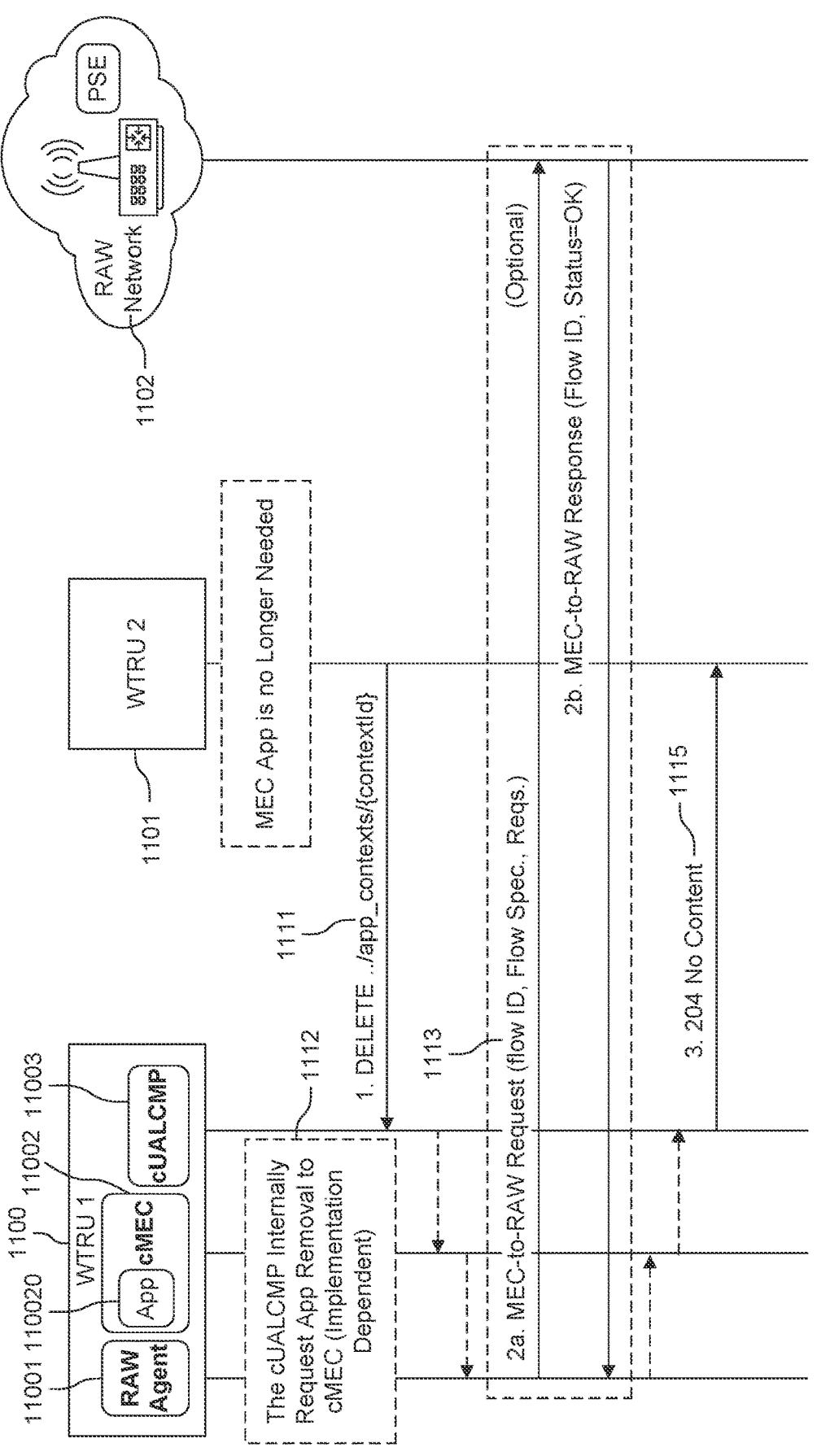
FIG. 11 is a sequence chart of a WTRU requesting app context removal to a cMEC in a WTRU, through a constrained UALCMP in a WTRU.

Similarly, the WTRU consuming the MEC application can request the deletion of it following the ETSI MEC procedures for the request of context removal, plus the steps required to remove the paths at the RAW network (optional). The complete procedure is depicted in FIG. 11.

Step 1: The consumer WTRU2, 1101, sends a DELETE ../app_context{contextId} 1111 to request the removal of the instantiation of the app to the WTRU1, 1100, hosting the cMEC 11002 where the app 110020 is running. Depending on implementation, the cUALCMP internally requests App removal to the cMEC, 1112.

Step 2: Optionally, if the WTRUs 1 (1100) and 2 (1101) are RAW-capable (e.g., WTRU1 1100 includes a RAW agent 11001) and connected to a RAW-capable network 1102, the WTRU1 (1100) hosting the cMEC 11002 will perform the RAW signaling 1113 to remove the path configuration in the network for the traffic generated by the app 110020.

Step 3: the cUALCMP 11003 at the WTRU1 (1100) hosting the cMEC 11002 responds with a 204 No Content message 1115, indicating that the app 110020 has been removed.

WTRU Performing App Migration, Through Interaction with Constrained UALCMP@WTRUs (cUALCMP@WTRUs)

Embodiments are described here of procedures enabling a WTRU to perform MEC application migration between cMECs hosted at different WTRUs, including the potential configuration of the RAW network.

Figure 12:
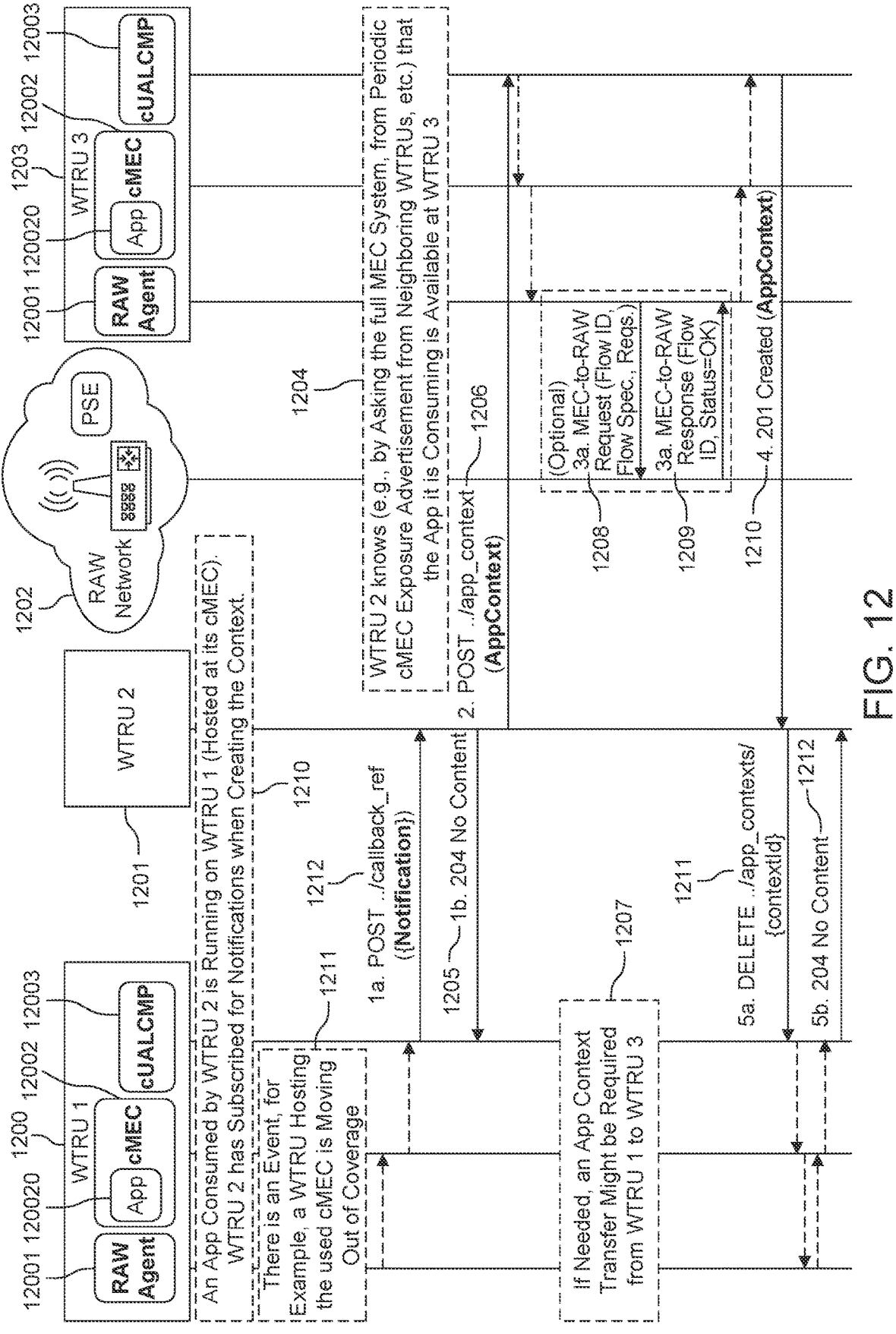
FIG. 12 is a sequence chart of an app migration.

FIG. 12 is an exemplary sequence diagram. As preconditions, (i) WTRU2 1201, is consuming an application 120020 running on WTRU1, 1200, (that has been previously instantiated, including the app context creation and the configuration of the RAW-capable network 1202 segment, if present), (ii) WTRU2, 1201, requested to be notified of changes in the cMEC 12002 at WTRU1 1200 and in the RAW connectivity (if present), and (iii) WTRU2 1201 knows about other neighboring available WTRUs hosting cMEC. We next explain each of the steps illustrated in FIG. 12, triggered by a change in the RAW connectivity (this is merely an example, a change in the cMEC resources would be another non-limiting example):

Step 1: the WTRU consuming the MEC app (WTRU2, 1201, in this example) is notified by the cUALCMP 12003 of a change in the connectivity (message 1a, 1212), and responds to that (message 1b, 1205).

Step 2: WTRU2, 1201, decides, 1206, based on its knowledge, 1204, of available neighboring WTRU hosting cMECs, which WTRU (WTRU3, 1203, in this example) to request the instantiation of the MEC app 120020, following the procedures described in section "WTRU requesting app instantiation to a cMEC@WTRU, through a constrained UALCMP@WTRU".

Step 3: the cUALCMP 12003 running at WTRU3, 1203, internally requests the instantiation of the MEC application at the hosted cMEC 12002. This procedure is implementation dependent. The cMEC 12002 may also contact the RAW agent 12001 running at the WTRU to trigger the setup of the required connectivity. The RAW agent 12001 would follow the known procedures to configure the RAW network to provide the indicated reliability and availability (steps 3a, 1208, and 3b, 1209).

Step 4: the cUALCMP 12003 returns the 201 Created response 1210 to the WTRU2, 1201, with the message body containing the data structure of the created application context.

Step 5: WTRU2, 1201, requests (5a), 1211, to delete the app 120020 running at WTRU1, 1200.

Depending on the app logic, a context transfer 1207 might be needed from WTRU1, 1200, to WTRU3, 1203.

Figure 18:
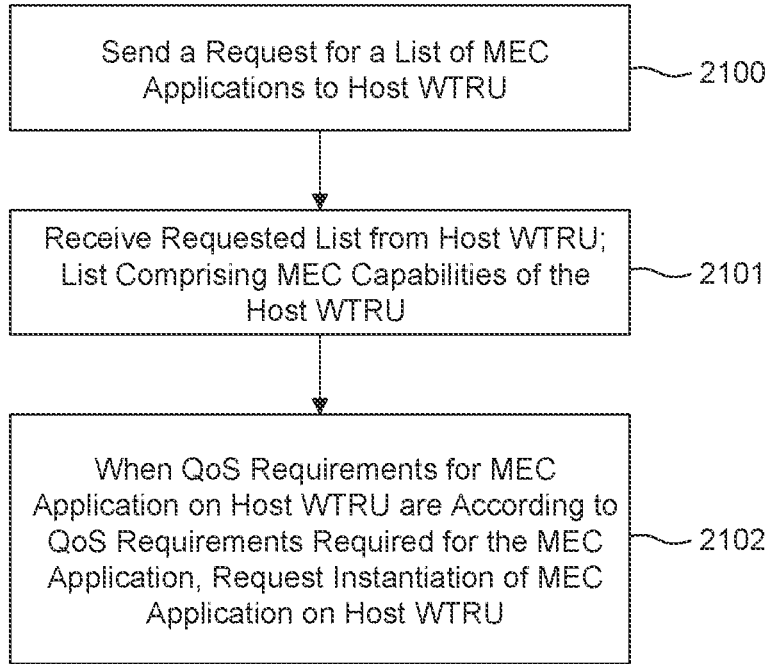
FIG. 18 is a flow chart of a method for instantiation of a MEC application on a host WTRU according to an embodiment.

FIG. 18 is a flow chart of an embodiment of the method for instantiation of a MEC application on a host WTRU. The method is implemented by another (second) WTRU. The method comprises, according to an embodiment:

Sending, 2100, to the host WTRU, a request for a list of MEC applications available on the host WTRU;

receiving, 2101, from the host WTRU, the requested list of MEC applications available on the host WTRU, the list comprising MEC capabilities of the host WTRU; and under condition that the MEC capabilities of the host WTRU are according to Quality of Service, QoS, requirements required by the second WTRU for the MEC application, sending, 2102, to the host WTRU, a request for instantiation of the MEC application.

The MEC capabilities may, according to an embodiment, include at least one of:

a duration of a validity of the MEC capabilities;

a geographical location of the host WTRU;

an identifier of the MEC;

a name of the MEC.

an expected remaining battery lifetime of the host WTRU;

a URI of a UALCMP interface of the host WTRU; and an identifier of a RAW capable network the host WTRU is attached to.

The QoS requirements may, according to an embodiment, include at least one of:

a reliability requirement;

an availability requirement;

The request for instantiation may, according to an embodiment, further include a configuration request for configuring the RAW capable network identified by the identifier of the RAW capable network the host is connected to, the identifier being included in the MEC capabilities.

The request for a list of MEC applications on the host WTRU may, according to an embodiment, be any of a Hypertext Transfer Protocol, HTTP, GET app_list message or a HTTP GET cmec_list message.

According to an embodiment, the requested of list of MEC applications available on the host WTRU is a Hypertext Transfer Protocol, HTTP, 200 OK message.

According to an embodiment, there is further provided a method for instantiation of a Multi-access Edge Computing, MEC, application on one of a set of host wireless transmit-receive unit, WTRUs, the method being implemented by a second WTRU, the method comprises:

sending, to the set of host WTRUs, a request for a list of MEC applications available on the set of host WTRUs;

receiving, from the set of host WTRUs, a list of MEC applications available on the host WTRUs, said list of MEC applications comprising MEC capabilities per host WTRU; and selecting, from the set of host WTRUs, a host WTRU having MEC capabilities that are according to Quality of Service, QoS, requirements required by the second WTRU for the application, and sending, to the selected host WTRU, a MEC application instantiation request for instantiating the MEC application.

According to a further embodiment of the method for instantiation of a Multi-access Edge Computing, MEC, application on one of a set of host wireless transmit-receive unit, WTRUs, the method being implemented by a second WTRU, the MEC capabilities comprise at least one of:

a duration of a validity of the MEC capabilities;

a geographical location of the host WTRU;

an identifier of the MEC;

a name of the MEC;

an expected remaining battery lifetime of the host WTRU;

a Uniform Resource Identifier of a User Application LifeCycle Management Proxy, UALCMP, interface of the host WTRU; and an identifier of a Reliable and Available Wireless, RAW, capable network the host WTRU is attached to.

According to a further embodiment of the method for instantiation of a Multi-access Edge Computing, MEC, application on one of a set of host wireless transmit-receive unit, WTRUs, the method being implemented by a second WTRU, the QoS requirements comprise at least one of:

a reliability requirement;

an availability requirement.

According to a further embodiment of the method for instantiation of a Multi-access Edge Computing, MEC, application on one of a set of host wireless transmit-receive unit, WTRUs, the method being implemented by a second WTRU, the request for instantiation comprises a configuration request for configuring the RAW capable network identified by the identifier of the RAW capable network the host is connected to, as comprised in the MEC capabilities.

According to a further embodiment of the method for instantiation of a Multi-access Edge Computing, MEC, application on one of a set of host wireless transmit-receive unit, WTRUs, the method being implemented by a second WTRU, the request for a list of MEC applications on the host WTRU is any of a Hypertext Transfer Protocol, HTTP, GET app_list message or a HTTP GET cmec_list message.

According to a further embodiment of the method for instantiation of a Multi-access Edge Computing, MEC, application on one of a set of host wireless transmit-receive unit, WTRUs, the method being implemented by a second WTRU, the requested list of MEC applications available on the host WTRU is a Hypertext Transfer Protocol, HTTP, 200 OK message.

According to an embodiment, there is provided a method for instantiation of a Multi-access Edge Computing, MEC, application on a host wireless transmit-receive unit, WTRU, the method being implemented by a second WTRU, the method comprising:

sending, to a MEC system, a request for a list of MEC applications available on host WTRUs;

receiving, from the MEC system, a list of host WTRUs capable of instantiating MEC applications, and, for each of the host WTRUs in the list of host WTRUs, a list of MEC applications available on the host WTRUs, said list of MEC applications comprising MEC capabilities of the host WTRU; and selecting, from the received list of host WTRUs, a host WTRU having MEC capabilities that are according to Quality of Service, QoS, requirements required by the second WTRU for the application, and sending, to the selected host WTRU, a MEC application instantiation request for instantiating the MEC application.

According to a further embodiment of the method for instantiation of a Multi-access Edge Computing, MEC, application on a host wireless transmit-receive unit, WTRU, the method being implemented by a second WTRU, the MEC capabilities comprise at least one of:

a duration of a validity of the MEC capabilities;

a geographical location of the host WTRU;

an identifier of the MEC;

a name of the MEC;

an expected remaining battery lifetime of the host WTRU;

a Uniform Resource Identifier of a User Application LifeCycle Management Proxy, UALCMP, interface of the host WTRU; and an identifier of a Reliable and Available Wireless, RAW, capable network the host WTRU is attached to.

According to a further embodiment of the method for instantiation of a Multi-access Edge Computing, MEC, application on a host wireless transmit-receive unit, WTRU, the method being implemented by a second WTRU, the QoS requirements comprise at least one of:

a reliability requirement;

an availability requirement.

According to a further embodiment of the method for instantiation of a Multi-access Edge Computing, MEC, application on a host wireless transmit-receive unit, WTRU, the method being implemented by a second WTRU, the request for instantiation comprises a configuration request for configuring the RAW capable network identified by the identifier of the RAW capable network the host is connected to, as comprised in the MEC capabilities.

According to a further embodiment of the method for instantiation of a Multi-access Edge Computing, MEC, application on a host wireless transmit-receive unit, WTRU, the method being implemented by a second WTRU, the request for a list of MEC applications on host WTRUs is any of a Hypertext Transfer Protocol, HTTP, GET app_list message or a HTTP GET cmec_list message.

According to a further embodiment of the method for instantiation of a Multi-access Edge Computing, MEC, application on a host wireless transmit-receive unit, WTRU, the method being implemented by a second WTRU, the requested list of MEC applications available on host WTRUs is a Hypertext Transfer Protocol, HTTP, 200 OK message.

According to an embodiment, there is provided a method for providing Multi-access Edge Computing, MEC, capabilities of wireless transmit-receive units, WTRUs, in a network to the WTRUs in the network, the method comprising:

receiving, from WTRUs in the network, information related to capabilities of MEC hosts at WTRUs in the network that are capable of running MEC applications;

sending an acknowledge to the WTRUs for having received the information;

receiving, from at least one of the WTRUs in the network, a request for a list of WTRUs in the network capable of running MEC applications;

sending, to the at least one of the WTRUs in the network from which the request for the list is received, the list of WTRUs in the network capable of running MEC applications, the list comprising, for each of the WTRUs in the list, a data structure comprising MEC capabilities of the WTRU, based on the information received from the WTRUs.

According to a further embodiment of the method for providing Multi-access Edge Computing, MEC, capabilities of wireless transmit-receive units, WTRUs, in a network to the WTRUs in the network, the MEC capabilities comprise at least one of:

a duration of a validity of the MEC capabilities;

a geographical location of the host WTRU;

an identifier of the MEC;

a name of the MEC;

an expected remaining battery lifetime of the host WTRU;

a Uniform Resource Identifier of a User Application LifeCycle Management Proxy, UALCMP, interface of the host WTRU; and an identifier of a Reliable and Available Wireless, RAW, capable network the host WTRU is attached to.

According to an embodiment, there is provided a method for transferring a Multi-access Edge Computing, MEC, application instantiated on a first wireless transmit-receive unit, WTRU, to a second WTRU, the method being implemented by the second WTRU, the method comprising:

receiving, from the first WTRU, a notification of an event impacting the Quality of Service, QoS, of execution of the MEC application on the first WTRU;

under condition that the QoS of execution of the MEC application is lower than a QoS required by the second WTRU for execution of the MEC application on the first WTRU, sending, to a third WTRU, a request for instantiation of the MEC application on the third WTRU;

under condition that an acknowledgement is received from the third WTRU indicating that the MEC application has been instantiated by the third WTRU, sending, to the first WTRU, a request to delete the MEC application for which the notification has been received.

According to a further embodiment of the method for transferring a Multi-access Edge Computing, MEC, application instantiated on a first wireless transmit-receive unit, WTRU, to a second WTRU, the method being implemented by the second WTRU, the notification comprises one of a change in Reliable and Available Wireless, RAW, connectivity or a change in MEC resources.

According to a further embodiment of the method for transferring a Multi-access Edge Computing, MEC, application instantiated on a first wireless transmit-receive unit, WTRU, to a second WTRU, the method being implemented by the second WTRU, the notification is received from a User Application LifeCycle Management Proxy, UALCMP, interface of the first WTRU.

According to a further embodiment of the method for transferring a Multi-access Edge Computing, MEC, application instantiated on a first wireless transmit-receive unit, WTRU, to a second WTRU, the method being implemented by the second WTRU, the notification is received in a Hypertext Transfer Protocol, HTTP, POST message.

According to a further embodiment of the method for transferring a Multi-access Edge Computing, MEC, application instantiated on a first wireless transmit-receive unit, WTRU, to a second WTRU, the method being implemented by the second WTRU, the method further comprises, in addition to sending, to the third WTRU, the request for instantiation of the MEC application on the third WTRU, sending, to the third WTRU, a request to provide the QoS requirements for execution of the MEC application according to the QoS required by the second WTRU.

According to an embodiment, there is provided a method for removal of a Multi-access Edge Computing, MEC, application instantiated on a first wireless transmit-receive unit, WTRU, by a second WTRU, the method being implemented by the second WTRU, the method comprising:

sending, to the first WTRU, a request for deleting the MEC application on the first WTRU;

receiving, from the first WTRU, a notification indicating that the MEC application has been removed by the first WTRU.

According to a further embodiment of the method for removal of a Multi-access Edge Computing, MEC, application instantiated on a first wireless transmit-receive unit, WTRU, by a second WTRU, the request for deleting is a Hypertext Transfer Protocol, HTTP, DELETE app_context message.

According to a further embodiment of the method for removal of a Multi-access Edge Computing, MEC, application instantiated on a first wireless transmit-receive unit, WTRU, by a second WTRU, the notification is a Hypertext Transfer Protocol, HTTP, 204 No Content message.

FIG. 19 is a flow chart of a method, implemented by a first Wireless Transmit-Receive Unit, WTRU, according to an embodiment. In 2200, the WTRU transmits, to a second WTRU, first information relative to configuration information of the first WTRU and relative to edge computing applications that are instantiable (e.g., a list of edge computing applications that may be instantiated (executed)) on the first WTRU as well as MEC capabilities of the first WTRU) on the first WTRU. In 2201, the first WTRU receives, from the second WTRU, a request for instantiation, on the first WTRU, of an edge computing application selected from the first information, the request for instantiation comprising information relative to the selected edge computing application, and at least one parameter for instantiating the selected edge computing application. In 2202, the selected edge computing application is instantiated, based on the at least one parameter.

According to an embodiment of the method implemented by the first WTRU, the method includes receiving, from the second WTRU, a request for the first information (e.g., pull of discovery information).

According to an embodiment of the method implemented by the first WTRU, the method includes periodically transmitting at destination of WTRUs neighboring the first WTRU (e.g., neighboring WTRUs may be discovered by network discovery), the WTRUs neighboring the first WTRU comprising the second WTRU, the first information (e.g., push, or advertisement of discovery information).

According to an embodiment of the method implemented by the first WTRU, the at least one parameter includes at least one of, for the selected edge computing application:

a requested application lifetime;

an indication whether the selected edge computing application may be migrated or not, by the first WTRU, to a third WTRU.

According to an embodiment of the method implemented by the first WTRU, the configuration information of the first WTRU comprises any of:

an identifier of the first WTRU;

a duration of time relative to validity of the configuration information; a remaining battery lifetime of the first WTRU;

a geolocation of the first WTRU.

According to an embodiment of the method implemented by the first WTRU, which embodiment is related to RAW features, the configuration information of the first WTRU comprises any of: an indication whether the first WTRU is attached to a reliable and available wireless network; an identifier of a reliable and available wireless network the first WTRU is attached to.

According to an embodiment of the method implemented by the first WTRU, which embodiment is related to RAW features, the configuration information of the first WTRU comprises an identifier of a reliable and available wireless network the first WTRU is attached to, the at least one parameter for instantiating the selected edge computing application comprises at least one of:

a desired wireless connectivity reliability requirement;

a desired wireless connectivity availability requirement.

According to an embodiment of the method implemented by the first WTRU, which embodiment is related to RAW features, the first WTRU, when instantiating the selected edge computing application, configures the reliable and available wireless network the first WTRU is attached to, according to at least one of the desired wireless connectivity reliability requirement and the desired wireless connectivity availability requirement.

FIG. 20 is a method implemented by a second WTRU. In 2300, the second WTRU receives, from at least one first WTRU, first information of the at least one first WTRU and relative to configuration information of the first WTRU and relative to edge computing applications instantiable on the at least one first WTRU. In 2301, under condition that quality of service, QoS, capabilities of a first WTRU of the at least one first WTRU comprised in the first information satisfies QoS requirements of the second WTRU for instantiating an edge computing application on the first WTRU, the second WTRU transmits, to the first WTRU, a request for instantiation of a selected edge computing application, selected by the second WTRU from edge computing applications instantiable on the first WTRU, and at least one parameter for instantiating the selected edge computing application.

According to an embodiment of the method implemented by the second WTRU, the method includes transmitting, to the at least one first WTRU, a request for the first information.

According to an embodiment of the method implemented by the second WTRU, the method includes periodically receiving the first information from the at least one first WTRU.

According to an embodiment of the method implemented by the second WTRU, the at least one parameter comprises at least one of, for the selected edge computing application:

a requested application lifetime;

an indication whether the selected edge computing application may be migrated or not, by the first WTRU, to a third WTRU.

According to an embodiment of the method implemented by the second WTRU, the configuration information of the first WTRU comprises any of:

an identifier of the first WTRU;

a duration of time relative to validity of the configuration information;

a remaining battery lifetime of the first WTRU;

a geolocation of the first WTRU.

According to an embodiment of the method implemented by the second WTRU, the configuration information of the first WTRU comprises any of: an indication whether the first WTRU is attached to a reliable and available wireless network; an identifier of a reliable and available wireless network the first WTRU is attached to.

According to an embodiment of the method implemented by the second WTRU, the configuration information of the first WTRU comprises an identifier of a reliable and available wireless network the first WTRU is attached to, and wherein the at least one parameter for instantiating the selected edge computing application comprises at least one of:

a desired wireless connectivity reliability requirement;

a desired wireless connectivity availability requirement.

According to an embodiment of the method implemented by the second WTRU, the first WTRU, when instantiating the selected edge computing application, configures the reliable and available wireless network the first WTRU is attached to, according to at least one of the desired wireless connectivity reliability requirement and the desired wireless connectivity availability requirement.

According to a further embodiment, there is disclosed a first Wireless Transmit-Receive Unit, WTRU, comprising at least one processor. The at least one processor is configured to transmit, to a second WTRU, first information relative to configuration information of the first WTRU and relative to edge computing applications instantiable on the first WTRU. The at least one processor is further configured to receive, from the second WTRU, a request for instantiation, on the first WTRU, of an edge computing application selected from the first information, the request for instantiation comprising information relative to the selected edge computing application, and at least one parameter for instantiating the selected edge computing application. The at least one processor is further configured to instantiate the selected edge computing application, based on the at least one parameter.

According to an embodiment of the first WTRU comprising at least one processor, the at least one processor is configured to receive, from the second WTRU, a request for the first information (e.g., pull of discovery information).

According to an embodiment of the first WTRU comprising at least one processor, the at least one processor is configured to periodically transmit at destination of WTRUs neighboring the first WTRU (e.g., neighboring WTRUs may be discovered by network discovery), the WTRUs neighboring the first WTRU comprising the second WTRU, the first information (e.g., push, or advertisement of discovery information).

According to an embodiment of the first WTRU comprising at least one processor, the at least one parameter includes at least one of, for the selected edge computing application:

a requested application lifetime;

an indication whether the selected edge computing application may be migrated or not, by the first WTRU, to a third WTRU.

According to an embodiment of the first WTRU comprising at least one processor, the configuration information of the first WTRU comprises any of:

an identifier of the first WTRU;

a duration of time relative to validity of the configuration information; a remaining battery lifetime of the first WTRU;

a geolocation of the first WTRU.

According to an embodiment of the first WTRU comprising at least one processor, which embodiment is related to RAW features, the configuration information of the first WTRU comprises any of: an indication whether the first WTRU is attached to a reliable and available wireless network; an identifier of a reliable and available wireless network the first WTRU is attached to.

According to an embodiment of the first WTRU comprising at least one processor, which embodiment is related to RAW features, the configuration information of the first WTRU comprises an identifier of a reliable and available wireless network the first WTRU is attached to, the at least one parameter for instantiating the selected edge computing application comprises at least one of:

a desired wireless connectivity reliability requirement;

a desired wireless connectivity availability requirement.

According to an embodiment of the first WTRU comprising at least one processor, which embodiment is related to RAW features, the at least one processor is configured to, when instantiating the selected edge computing application, configure the reliable and available wireless network the first WTRU is attached to, according to at least one of the desired wireless connectivity reliability requirement and the desired wireless connectivity availability requirement.

According to a further embodiment, there is disclosed a second Wireless Transmit-Receive Unit, WTRU, comprising at least one processor. The at least one processor is configured to receive, from at least one first WTRU, first information of the at least one first WTRU and relative to configuration information of the first WTRU and relative to edge computing applications instantiable on the at least one first WTRU. The at least one processor is further configured to, under condition that quality of service, QoS, capabilities of a first WTRU of the at least one first WTRU comprised in the first information satisfies QoS requirements of the second WTRU for instantiating an edge computing application on the first WTRU, transmit, to the first WTRU, a request for instantiation of a selected edge computing application, selected by the second WTRU from edge computing applications instantiable on the first WTRU, and at least one parameter for instantiating the selected edge computing application.

According to an embodiment of the second WTRU comprising at least one processor, the at least one processor is configured to transmit, to the at least one first WTRU, a request for the first information.

According to an embodiment of the second WTRU comprising at least one processor, the at least one processor is configured to periodically receive the first information from the at least one first WTRU.

According to an embodiment of the second WTRU comprising at least one processor, the at least one parameter comprises at least one of, for the selected edge computing application:

a requested application lifetime;

an indication whether the selected edge computing application may be migrated or not, by the first WTRU, to a third WTRU.

According to an embodiment of the second WTRU comprising at least one processor, the configuration information of the first WTRU comprises any of:

an identifier of the first WTRU;

a duration of time relative to validity of the configuration information;

a remaining battery lifetime of the first WTRU;

a geolocation of the first WTRU.

According to an embodiment of the second WTRU comprising at least one processor, the configuration information of the first WTRU comprises any of: an indication whether the first WTRU is attached to a reliable and available wireless network; an identifier of a reliable and available wireless network the first WTRU is attached to.

According to an embodiment of the second WTRU comprising at least one processor, the configuration information of the first WTRU comprises an identifier of a reliable and available wireless network the first WTRU is attached to, and wherein the at least one parameter for instantiating the selected edge computing application comprises at least one of:

a desired wireless connectivity reliability requirement;

a desired wireless connectivity availability requirement.

According to an embodiment of the second WTRU comprising at least one processor, the first WTRU, when instantiating the selected edge computing application, configures the reliable and available wireless network the first WTRU is attached to, according to at least one of the desired wireless connectivity reliability requirement and the desired wireless connectivity availability requirement.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality.

Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method, implemented by a first wireless transmit-receive unit (WTRU), the method comprising:

receiving configuration information from at least one second WTRU, the configuration information comprising, for each WTRU of the at least one second WTRU, an indication of one or more edge computing applications instantiable at the each WTRU;

selecting, from the at least one second WTRU, and based on the configuration information, a second WTRU and an edge computing application instantiable on the selected second WTRU, the edge computing application satisfying at least one first quality of service (QOS) requirement of the first WTRU for instantiating edge computing applications; and transmitting, to the second WTRU, a request for instantiation of the edge computing application, the request for instantiation comprising at least one second QoS requirement parameter for instantiating the edge computing application at the second WTRU with a QoS according to the at least one first QoS requirement of the first WTRU.

2. The method according to claim 1, comprising transmitting, to the at least one second WTRU, a request to receive the configuration information.

3. The method according to claim 1, comprising periodically receiving the configuration information from the at least one second WTRU.

4. The method according to claim 1, wherein the at least one second QoS requirement parameter comprises at least one of: a requested application lifetime; and an indication of whether the application may be migrated or not, by the second WTRU, to a third WTRU.

5. The method according to claim 1, wherein the configuration information comprises any of: a duration of time relative to validity of the configuration information; a remaining battery lifetime of the second WTRU; and a geolocation of the second WTRU.

6. The method according to claim 1, wherein the configuration information comprises any of: an indication whether the second WTRU is attached to a reliable and available wireless (RAW) network; and an identifier of a RAW network the second WTRU is attached to.

7. The method according to claim 1, wherein the configuration information comprises an identifier of a reliable and available wireless (RAW) network the second WTRU is attached to, and wherein the at least one second QoS requirement parameter comprises at least one of:

a wireless connectivity reliability requirement; and a wireless connectivity availability requirement.

8. The method according to claim 7, wherein the second WTRU, when instantiating the edge computing application, configures the RAW network, according to at least one of the wireless connectivity reliability requirement and the wireless connectivity availability requirement.

9. A first wireless transmit-receive unit (WTRU) comprising at least one processor configured to:

receive configuration information from at least one second WTRU, the configuration information comprising, for each WTRU of the at least one second WTRU, an indication of one or more edge computing applications instantiable at the each WTRU;

select, from the at least one second WTRU, and based on the configuration information, a second WTRU and an edge computing application instantiable on the second WTRU, the edge computing application satisfying at least one first quality of service (QOS) requirement of the first WTRU for instantiating edge computing applications; and transmit, to the second WTRU, a request for instantiation of the edge computing application, the request for instantiation comprising at least one second QoS requirement parameter for instantiating the edge computing application at the second WTRU with a QoS according to the at least one first QoS requirement of the first WTRU.

10. The WTRU according to claim 9, wherein the at least one processor is configured to transmit, to the at least one second WTRU, a request to receive the configuration information.

11. The WTRU according to claim 9, wherein the at least one processor is configured to periodically receive the configuration information from the at least one second WTRU.

12. The WTRU according to claim 9, wherein the at least one second QoS requirement parameter comprises at least one of: a requested application lifetime; and an indication whether the application may be migrated or not, by the second WTRU, to a third WTRU.

13. The WTRU according to claim 9, wherein the configuration information comprises any of: a duration of time relative to validity of the configuration information; a remaining battery lifetime of the second WTRU; and a geolocation of the second WTRU.

14. The WTRU according to claim 9, wherein the configuration information comprises any of: an indication of whether the second WTRU is attached to a reliable and available wireless (RAW) network; and an identifier of a RAW network the second WTRU is attached to.

15. The WTRU according to claim 9, wherein the configuration information comprises an identifier of a reliable and available wireless (RAW) network the second WTRU is attached to, and wherein the at least one second QoS requirement parameter comprises at least one of:

a wireless connectivity reliability requirement; and a wireless connectivity availability requirement.

* * * * *